United States Patent
Futaki et al.

(10) Patent No.: US 12,160,894 B2
(45) Date of Patent: Dec. 3, 2024

(54) RAN NODE, RADIO TERMINAL, AND METHODS THEREFOR

(71) Applicant: NEC Corporation, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 352 days.

(21) Appl. No.: 17/629,843

(22) PCT Filed: Nov. 30, 2020

(86) PCT No.: PCT/JP2020/044537
§ 371 (c)(1),
(2) Date: Jan. 25, 2022

(87) PCT Pub. No.: WO2021/161622
PCT Pub. Date: Aug. 19, 2021

(65) Prior Publication Data
US 2022/0287102 A1    Sep. 8, 2022

(30) Foreign Application Priority Data

Feb. 13, 2020    (JP) .................................. 2020-022376

(51) Int. Cl.
*H04W 74/0833*    (2024.01)
*H04L 5/00*    (2006.01)
(Continued)

(52) U.S. Cl.
CPC ....... *H04W 74/0833* (2013.01); *H04L 5/0092* (2013.01); *H04W 48/10* (2013.01); *H04W 76/27* (2018.02)

(58) Field of Classification Search
None
See application file for complete search history.

(56) References Cited

U.S. PATENT DOCUMENTS

2019/0104554 A1    4/2019    Amuru et al.
2019/0261425 A1*   8/2019    Park .................... H04L 5/0098
(Continued)

FOREIGN PATENT DOCUMENTS

JP    2018-064252 A    4/2018
JP    2023-511897 A    3/2023
(Continued)

OTHER PUBLICATIONS

JP Office Action for JP Application No. 2022-500237, mailed on Sep. 12, 2023 with English Translation.
(Continued)

*Primary Examiner* — Hong S Cho
(74) *Attorney, Agent, or Firm* — Sughrue Mion, PLLC

(57) ABSTRACT

A RAN node (1) broadcasts a first initial bandwidth part (BWP) configuration via system information, and broadcasts a second initial BWP configuration via the system information or transmits it via radio terminal dedicated signaling. The first initial BWP configuration includes cell-specific common parameters of a first initial BWP of a cell, while the second initial BWP configuration includes cell-specific common parameters of a second initial BWP of the cell. The second initial BWP is not used by a first type of radio terminal, but is used by a second type of radio terminal. The bandwidth of the second initial BWP is equal to or narrower than of the first initial BWP. This allows the second type of radio terminal, which has a limited capability compared to the first type of radio terminal, to use an initial BWP suitable for its capability.

21 Claims, 16 Drawing Sheets

(51) Int. Cl.
*H04W 48/10* (2009.01)
*H04W 76/27* (2018.01)

(56) References Cited

U.S. PATENT DOCUMENTS

| | | | |
|---|---|---|---|
| 2019/0373667 A1 | 12/2019 | Jeon et al. | |
| 2020/0221506 A1* | 7/2020 | Jeon | H04W 74/0833 |
| 2020/0305123 A1 | 9/2020 | Takeda et al. | |
| 2021/0250929 A1* | 8/2021 | Sakhnini | H04W 48/12 |
| 2022/0361122 A1 | 11/2022 | Zheng et al. | |

FOREIGN PATENT DOCUMENTS

| | | |
|---|---|---|
| WO | 2017/170448 A1 | 10/2017 |
| WO | 2019/096213 A1 | 5/2019 |
| WO | 2019/160481 A1 | 8/2019 |
| WO | 2021/146998 A1 | 7/2021 |

OTHER PUBLICATIONS

Huawei, HiSilicon, "Summary of email discussion [105bis#06] on channel bandwidth and initial BWP bandwidth", 3GPP TSG RAN WG2 #106 R2-1907824, May 17, 2019, pp. 1-pp. 18.

Ericsson, "Draft LS reply on supported BW for initial BWP", 3GPP TSG RAN WG4 #92 R4-1908710, Aug. 30, 2019, pp. 1-pp. 6.

Office Action dated Apr. 4, 2023 issued in Japanese Application No. 2022-500237.

Extended European Search Report for EP Application No. 20919126.1, dated on Sep. 9, 2022.

Panasonic: "On default bandwidth part", 3GPP Draft; 3GPP TSG-RAN WG1 NR Ad-Hoc#2, R1-1710787, Jun. 15, 2017.

International Search Report for PCT Application No. PCT/JP2020/044537, mailed on Feb. 22, 2021.

RP-193238, Ericsson, "New SID on support of reduced capability NR devices", 3GPP TSG RAN Meeting #86, Sitges, Spain, Dec. 9-12, 2019, pp. 1-5.

R1-197396, ITL, Physical layer structure for NR V2X, 3GPP TSG RAN WG1 #97, May 17, 2019, pp. 1-10.

R1-1810138, Huawei, Hisilicon, Sidelink PHY structure and procedure for NR V2X, 3GPP TSG RAN WG1 #94b, Oct. 12, 2018, pp. 1-15.

R2-1808645, Samsung, Email discussion on RRC triggered BWP activation, 3GPP TSG RAN WG2 NR #102, May 25, 2018, pp. 1-9.

* cited by examiner

RAN NODE, RADIO TERMINAL, AND METHODS THEREFOR

This application is a National Stage Entry of PCT/JP2020/044537 filed on Nov. 30, 2020, which claims priority from Japanese Patent Application 2020-022376 filed on Feb. 13, 2020, the contents of all of which are incorporated herein by reference, in their entirety.

TECHNICAL FIELD

The present disclosure relates to a radio communication network, and in particular to a bandwidth part (BWP) configuration.

BACKGROUND ART

The 3rd Generation Partnership Project (3GPP) will start working on Release 17 in the first quarter of 2020. Release 17 plans to support a new device type called reduced capability New Radio (NR) devices (see Non-patent Literature 1). The reduced capability NR devices are also referred to as low complexity NR devices or NR-Light devices. The main motivation for the reduced capability NR devices is to reduce device costs and complexity compared to high-end enhanced Mobile Broad Band (eMBB) and Ultra Reliable and Low Latency Communication (URLLC) devices (User Equipments (UEs)). One of potential complexity reduction features is limited Radio Frequency (RF) capability. Specifically, reduced capability NR devices are assumed to have reduced UE bandwidth capability compared to eMBB and URLLC devices.

CITATION LIST

Patent Literature

[Patent Literature 1] Japanese Unexamined Patent Application Publication No. 2018-064252
[Patent Literature 2] International Patent Publication No. WO2017/170448

Non Patent Literature

[Non-patent Literature 1] Ericsson, "New SID on support of reduced capability NR devices", RP-193238, 3GPP TSG RAN Meeting #86, Sitges, Spain, Dec. 9-12, 2019

SUMMARY OF INVENTION

Technical Problem

The inventors have studied reduced capability NR devices and found various problems. A 5G UE needs to receive Minimum System Information (SI) before it performs initial access. In a 5G system (5GS), System Information (SI) includes the Master Information Block (MIB) and a number of System Information Blocks (SIBs), which are divided into Minimum SI and Other SI. The Minimum SI is always being broadcast periodically and contains basic information required for initial access and information for acquiring any other SI. More specifically, the Minimum SI contains the MIB and the SIB type 1 (SIB1), while the Other SI contains the SIB type 2 (SIB2) and subsequent SIB types.

The MIB is periodically transmitted on a Broadcast Channel (BCH) and a Physical Broadcast Channel (PBCH). The MIB contains information regarding cell barring and further contains essential physical-layer information of the cell needed to decode the SIB1. More specifically, the MIB indicates a System Frame Number (SFN), a subcarrier spacing for the SIB1 (subCarrierSpacingCommon), an ssb-SubcarrierOffset indicating the position of an SS/PBCH block in frequency domain, and a Physical Downlink Control Channel (PDCCH) configuration (pdcch-ConfigSIB1) needed to decode SIB1. The pdcch-ConfigSIB1 field (a PDCCH-ConfigSIB1 information element) of the MIB includes configurations of a Common Resource Set (CORESET) #0 and a common search space (search space #0).

A UE determines a number of consecutive resource blocks and a number of consecutive symbols for the CORESET of the Type0-PDCCH common search space (CSS) set from a controlResourceSetZero field (or ControlResourceSetZero information element) within the pdcch-ConfigSIB1 field of the MIB. Further, the UE determines PDCCH monitoring occasions from a searchSpaceZero field (or SearchSpaceZero information element) within the pdcch-ConfigSIB1 field of the MIB. The UE then attempts to receive Downlink Control Information (DCI) in the determined common search space #0 (i.e., Type0-PDCCH search space). This DCI indicates the assignment of Physical Downlink Shared Channel (PDSCH) resources on which the SIB1 is transmitted.

The SIB1 is also referred to as Remaining Minimum SI (RMSI). The SIB1 is periodically transmitted on a Downlink Shared Channel (DL-SCH) and a Physical Downlink Shared Channel (PDSCH). The SIB1 includes information needed for initial access. The SIB1 also indicates the availability and scheduling (e.g., periodicity and an SI window size) of Other SI (or Other SIBs). The SIB1 further indicates whether Other SIBs are provided via periodic broadcasting or on-demand basis.

More specifically, the SIB1 includes a cell-specific serving cell configuration (i.e., servingCellConfigCommon field (or ServingCellConfigCommonSIB information element)). The cell-specific serving cell configuration is common to UEs that perform initial access. The cell-specific serving cell configuration includes an initial Downlink (DL) bandwidth part (BWP) configuration (i.e., initialDownlinkBWP field (or BWP-DownlinkCommon information element)) and an initial UL BWP configuration (i.e., initialUplinkBWP field (or BWP-UplinkCommon information element)).

The initial DL BWP configuration broadcast in the SIB1 contains cell-specific common parameters of the initial DL BWP of the serving cell that supports Physical Uplink Control Channel (PUCCH) transmission and contention-based random access. These common parameters include parameters indicating the frequency-domain position and bandwidth of the initial DL BWP (i.e., a locationAndBandwidth field in a genericParameters field (or BWP information element) in the BWP-DownlinkCommon information element). These common parameters further include PDCCH parameters (i.e., a pdcch-ConfigCommon field (or PDCCH-ConfigCommon information element)). These PDCCH parameters configure one or more common search spaces in the initial DL BWP used to transmit a DCI format indicating PDSCH resources on which SIBs are broadcast.

The initial UL BWP configuration broadcast in the SIB1 contains cell-specific common parameters of the initial UL BWP of the serving cell that supports PUCCH transmission and contention-based random access. These common parameters include parameters indicating the frequency-domain position and bandwidth of the initial UL BWP (i.e., a locationAndBandwidth field within a genericParameters field (or BWP information element) in the BWP-Uplink- Common information element). In addition, these common parameters include PUCCH parameters (i.e., a pucch-ConfigCommon field (or PUCCH-ConfigCommon information element)). These PUCCH parameters configure a set of cell-specific PUCCH resources/parameters. A UE uses these PUCCH resources until a dedicated PUCCH configuration is provided on the initial uplink BWP. These common parameters further include cell-specific random access parameters that UEs use for contention-based random access in the initial UL BWP.

The following is a supplemental explanation of BWPs in 5G. In the Primary Cell (PCell), the network configures at least an initial DL BWP and one or two (if Supplemental Uplink (SUL) is used) initial UL BWPs. Further, the network can configure additional DL BWPs and dedicated UL BWPs for a serving cell on a per UE basis. In the Primary Cell (PCell), the initial DL and UL BWPs are DL and UL BWPs used by UEs for initial access, and UEs use the initial DL and UL BWPs until they receive dedicated BWP configurations.

In this specification, the term "initial BWP" is used for facilitating the explanation. The term "initial BWP" is used to refer to one or both of the initial DL BWP and the initial UL BWP.

As described above, in the PCell (i.e., the serving cell that supports PUCCH transmission and contention-based random access), the common parameters of the initial BWP are broadcast via the SIB1. Therefore, the common parameters (e.g., the frequency-domain position and bandwidth) of the initial BWP of the PCell are cell-specific and common to all UEs performing the initial access in that PCell. However, for example, the bandwidth of the initial BWP for normal UEs (e.g., eMBB and URLCC devices) may be too wide for reduced capability NR devices with reduced UE bandwidth capability.

Patent Literature 1 discloses that a base station configures PDCCH regions to different bandwidths for UEs depending on their respective UE capabilities (see, for example, FIG. 7 and paragraphs 0032, 0033 and 0037). Meanwhile, Patent Literature 2 discloses that a base station receives terminal capability information (UE capability) from a UE, and if the base station determines that the UE is only capable of receiving a relatively narrow bandwidth, the base station decides to transmit a broadcasting channel in this relatively narrow bandwidth, and notifies the UE of information about this relatively narrow bandwidth by a synchronization signal (see, for example, paragraph 0067). However, neither Patent Literature 1 nor Patent Literature 2 discloses anything about the initial BWP configuration.

One of the objects to be attained by embodiments disclosed herein is to provide apparatuses, methods, and programs that enable a second type of radio terminal with a limited capability compared to a first type of radio terminal to use an initial BWP suitable for its capability. It should be noted that the above-described object is merely one of the objects to be attained by the embodiments disclosed herein. Other objects or problems and novel features will be made apparent from the following description and the accompanying drawings.

Solution to Problem

In a first aspect, a Radio Access Network (RAN) node includes at least one memory and at least one processor coupled to the at least one memory. The at least one processor is configured to broadcast a first initial bandwidth part (BWP) configuration via system information. Further, the at least one processor is configured to broadcast a second initial BWP configuration via the system information or transmit the second initial BWP configuration via radio terminal dedicated signaling. The first initial BWP configuration includes cell-specific common parameters of a first initial BWP of a cell. The second initial BWP configuration includes cell-specific common parameters of a second initial BWP of the cell. The first initial BWP is used by at least a first type of radio terminal that performs contention-based random access in the cell. Meanwhile, the second initial BWP is not used by the first type of radio terminal, but is used by a second type of radio terminal that has a limited capability compared to the first type of radio terminal and performs contention-based random access in the cell. A bandwidth of the second initial BWP is equal to or narrower than a bandwidth of the first initial BWP.

In a second aspect, a radio terminal includes at least one memory and at least one processor coupled to the at least one memory. The at least one processor is configured to receive system information containing a first initial bandwidth part (BWP) configuration. Further, the at least one processor is configured to receive a second initial BWP configuration via the system information or via radio terminal dedicated signaling, and to use the received second initial BWP configuration. The first initial BWP configuration includes cell-specific common parameters of a first initial BWP of a serving cell of the radio terminal. The second initial BWP configuration includes cell-specific common parameters of a second initial BWP of the serving cell. The first initial BWP is used by at least a first type of radio terminal that performs contention-based random access in the serving cell. Meanwhile, the second initial BWP is not used by the first type of radio terminal, but is used by a second type of radio terminal that has a limited capability compared to the first type of radio terminal and performs contention-based random access in the serving cell. A bandwidth of the second initial BWP is equal to or narrower than a bandwidth of the first initial BWP.

In a third aspect, a method performed by a Radio Access Network (RAN) node includes the following steps:
(a) broadcasting a first initial bandwidth part (BWP) configuration via system information; and
(b) broadcasting a second initial BWP configuration via the system information or transmitting the second initial BWP configuration via radio terminal dedicated signaling.

In a fourth aspect, a method performed by a radio terminal includes the following steps:
(a) receiving system information containing a first initial bandwidth part (BWP) configuration;
(b) receiving a second initial BWP configuration via the system information or via radio terminal dedicated signaling; and
(c) using the second initial BWP configuration.

In a fifth aspect, a program includes a set of instructions (software codes) that, when loaded into a computer, causes the computer to perform the method according to the above-described third or fourth aspect.

Advantageous Effects of Invention

According to the above-described aspects, it is possible to provide apparatuses, methods, and programs that enable a second type of radio terminal with a limited capability compared to a first type of radio terminal to use an initial BWP suitable for its capability.

DESCRIPTION OF EMBODIMENT

Specific embodiments will be described hereinafter in detail with reference to the drawings. The same or corresponding elements are denoted by the same symbols throughout the drawings, and duplicated explanations are omitted as appropriate for the sake of clarity.

Each of the embodiments described below may be used individually, or two or more of the embodiments may be combined with one another as appropriate. These embodiments include novel features different from each other. Accordingly, these embodiments contribute to attaining objects or solving problems different from one another and also contribute to obtaining advantages different from one another.

A plurality of embodiments shown below will be described mainly for the 3rd Generation Partnership Project (3GPP) 5th generation mobile communication system (5G system (5GS)). However, these embodiments may be applied to other cellular communication systems that support multiple types of radio terminals and support initial BWPs similar to those in 5GS.

First Embodiment

Figure 1:
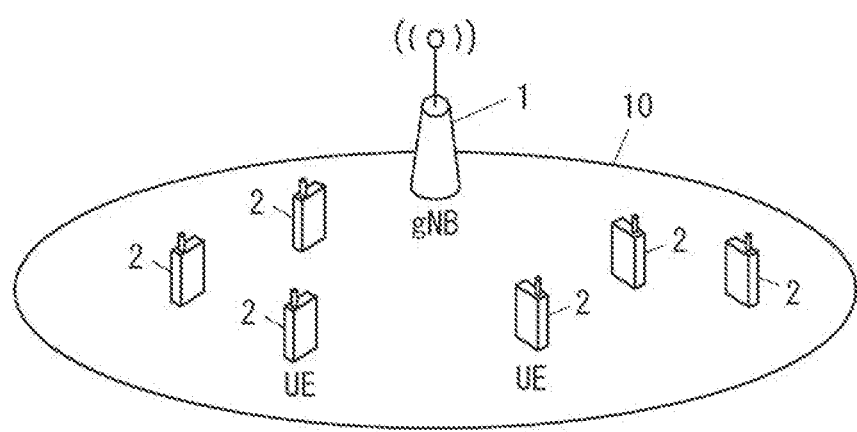
FIG. 1 shows an example of a configuration of a radio communication network according to an embodiment.

FIG. 1 shows an example of a configuration of a radio communication network (i.e., 5GS) according to embodiments, including this embodiment. In the example shown in FIG. 1, the radio communication network includes a Radio Access Network (RAN) node (i.e., a gNB) 1 and one or more radio terminals (i.e., UEs) 2. The gNB 1 is deployed in a RAN (i.e., a Next Generation (NG) RAN). The gNB 1 may include a gNB Central Unit (gNB-CU) and one or more gNB Distributed Units (gNB-DUs) in cloud RAN (C-RAN) deployment. The gNB 1 provides a cell 10 to multiple types of UEs. The multiple types of UEs use the cell 10 as their serving cell and perform Contention-Based Random Access (CBRA) in the cell 10. The gNB 1 may further provide one or more other cells. In this case, the cell 10 may be a primary cell (PCell) in Carrier Aggregation (CA), while the one or more other cells may be secondary cells (SCells). In other words, the cell 10 is a cell in which the UEs 2 perform an initial (RRC) connection establishment procedure or initiate an (RRC) connection re-establishment procedure.

The gNB 1 broadcasts Minimum SI (i.e., MIB and SIB1) in the cell 10. The gNB 1 may further transmit other SI. The other SI includes all SIBs that are not broadcast in the Minimum SI. These SIBs may be periodically broadcast on a DL-SCH, broadcast on demand on a DL-SCH (i.e., in response to a request from radio terminals (User Equipments (UEs)) in a Radio Resource Control (RRC)_IDLE or RRC_INACTIVE), or sent to UEs in RRC_CONNECTED on a DL-SCH in a dedicated manner. The other SIs include at least SIB2 to SIB9.

Each UE 2 performs cell selection or cell reselection when it is in the RRC_IDLE or RRC_INACTIVE state. In addition, each UE 2 may perform RRC connection re-establishment when it is in the RRC_CONNECTED state. Each UE 2 receives MIB and SIB1 in the cell 10, and configures an initial DL BWP and an initial UL BWP based on cell-specific common parameters of the initial DL BWP and initial UL BWP of the cell 10 included in the SIB1. Then, each UE 2 performs a random access procedure in the cell 10 by using the initial DL BWP and the initial UL BWP and initiates an RRC setup, RRC Resume, or RRC Re-establishment procedure.

In this embodiment, the UEs 2 are classified into a first type and a second type. The second type of UEs are UEs with limited capability compared to the first type of UEs. The second type of UEs may have limited RF capability compared to the first type of UEs. In other words, the second type of UEs may support a limited UE bandwidth (e.g., UE channel bandwidth, UE carrier bandwidth, or UE RF bandwidth) compared to the first type of UEs. The second type of UEs may be the above-described reduced capability NR devices, while the first type of UEs may be normal UEs (e.g., eMBB devices or URLLC devices). The second type of UEs may be, for example, industrial wireless sensors, wearable devices, or video surveillance devices (e.g., surveillance cameras).

The gNB 1 transmits a first initial BWP configuration and a second initial BWP configuration. The first initial BWP configuration includes cell-specific common parameters of the first initial BWP of the cell 10. The first initial BWP includes an initial DL BWP and an initial UL BWP. The first initial BWP is used by at least the first type of UEs that use the cell 10 as their serving cell. The first initial BWP is used by at least the first type of UEs, in accessing the cell 10 to transition from the RRC_IDLE or RRC_INACTIVE state to the RRC_CONNECTED state. In other words, the first initial BWP is a cell-specific BWP commonly used by at least the first type of UEs. The first initial BWP may also be used for initial access by the second type of UEs, and may be used by the second type of UEs until they receive the second initial BWP configuration or until a predetermined timing. The predetermined timing may be, for example, a point in time when the second type of UE receives a control signal, control information, or RRC message from the gNB 1 that triggers the second initial BWP configuration to be activated in the second type of UE.

The second initial BWP configuration includes cell-specific common parameters of a second initial BWP of the cell 10. The second initial BWP includes one or both of an initial DL BWP and an initial UL BWP. The bandwidth of the second initial DL BWP is narrower than the bandwidth of the first initial DL BWP. The bandwidth of the second initial UL BWP is equal to or narrower than the bandwidth of the first initial UL BWP. The second initial BWP is not used by the first type of UEs, but is used by the second type of UEs that use the cell 10 as their serving cell. In other words, the second initial BWP is a cell-specific BWP commonly used by the second type of UEs. The second initial BWP may be used by the second type of UEs, in accessing the cell 10 to transition from the RRC_IDLE or RRC_INACTIVE state to the RRC_CONNECTED state.

In some implementations, the cell-specific common parameters of the first initial BWP may include parameters indicating the frequency-domain position and bandwidth of the first initial DL BWP and may also include parameters indicating the frequency-domain position and bandwidth of the first initial UL BWP. The parameters indicating the frequency-domain position and bandwidth of the first initial DL BWP may be included in a locationAndBandwidth field in a genericParameters field (or BWP information element) in an initialDownlinkBWP field (or BWP-DownlinkCommon information element) contained in the SIB1. The parameters indicating the frequency-domain position and bandwidth of the first initial UL BWP may be included in a locationAndBandwidth field in a genericParameters field (or BWP information element) in an initialUplinkBWP field (or BWP-UplinkCommon information element) contained in the SIB1.

Similarly, the cell-specific common parameters of the second initial BWP may include parameters indicating the frequency-domain position and bandwidth of the second initial DL BWP, or parameters indicating the frequency-domain position and bandwidth of the second initial UL BWP, or both. The parameters indicating the frequency-domain position and bandwidth of the second initial DL BWP may be included in the locationAndBandwidth field in the genericParameters field (or BWP information element) in the initialDownlinkBWP field (or BWP-DownlinkCommon information element) contained in the SIB1. The parameters indicating the frequency-domain position and bandwidth of the second initial UL BWP may be included in the locationAndBandwidth field in the genericParameters field (or BWP information element) in the initialUplinkBWP field (or BWP-UplinkCommon information element) contained in the SIB1. The initialDownlinkBWP field (and BWP-DownlinkCommon information element), which contains the parameters indicating the frequency-domain position and bandwidth of the second initial DL BWP, may be an existing one or an extension (or branch) of an existing one. Alternatively, the field (and information element) in the SIB1, which contains the parameters indicating the frequency-domain position and bandwidth of the second initial DL BWP, may be a separate field corresponding to the initialDownlinkBWP field (and BWP-DownlinkCommon information element), such as an initialDownlinkBWP-ReducedCapability (RedCap), or an initialDownlinkBWP-ReducedCapability (RedCap) and a BWP-DownlinkCommon-ReducedCapability (RedCap). Similarly, the genericParameters field (and BWP information element) may be an existing one or an extension (or branch) of an existing one. Alternatively, the field (and information element) in the SIB1, which contains the parameters indicating the frequency-domain position and bandwidth of the second initial DL BWP, may be a field different from the existing genericParameters field (and BWP information element), such as a genericParametersReducedCapability (RedCap) information element, or a genericParametersReducedCapability (RedCap) and a BWP-ReducedCapability (RedCap) information elements.

Additionally or alternatively, the cell-specific common parameters of the first initial BWP may include PDCCH parameters. These PDCCH parameters may configure a common search space (or searchSpaceOtherSystemInformation) used by UEs to receive a DCI format indicating PDSCH resources on which a system information message (e.g., one or more of SIB2 to SIB9) is broadcast, a common search space (or pagingSearchSpace) used by UEs to receive a DCI format indicating PDSCH resources on which a paging message is transmitted, and one or more other common search spaces within the first initial DL BWP.

Similarly, the cell-specific common parameters of the second initial BWP may include PDCCH parameters. These PDCCH parameters may configure a common search space (or searchSpaceOtherSystemInformation field) used by UEs to receive a DCI format indicating PDSCH resources on which a system information message (e.g., one or more of SIB2 to SIB9) is broadcast, a common search space (or pagingSearchSpace field) used by UEs to receive a DCI format indicating PDSCH resources on which a paging message is transmitted, and one or more other common search spaces within the second initial DL BWP. The searchSpaceOtherSystemInformation and pagingSearchSpace fields, designated by the PDCCH parameters in the cell-specific common parameters of the second initial BWP, may be existing ones or extensions (or branches) of existing ones. Alternatively, these fields may be different from existing ones, such as a searchSpaceOtherSystemInformationReducedCapability (RedCap) and a pagingSearchSpaceReducedCapability (RedCap).

Additionally or alternatively, the cell-specific common parameters of the first initial BWP may include random access parameters that at least the first type of UEs use for contention-based random access in the first initial UL BWP. These random access parameters may indicate, along with other parameters, for example, the total number of random access preambles, or subcarrier spacing for the first message (Msg1), or both.

Similarly, the cell-specific common parameters of the second initial BWP may include random access parameters that the second type of UEs use for contention-based random access in the second initial UL BWP. These random access parameters may indicate, along with other parameters, for example, the total number of random access preambles, or subcarrier spacing for the first message (Msg1), or both. The random access parameters of the second initial BWP (e.g., their configured values, or radio resources derived from the configured values) may be different from those of the first initial BWP. For example, the random access parameters of the second initial BWP may be configured so that they do not overlap (exclusively) with those of the first initial BWP, or may partially overlap with those of the first initial BWP.

Figure 2:
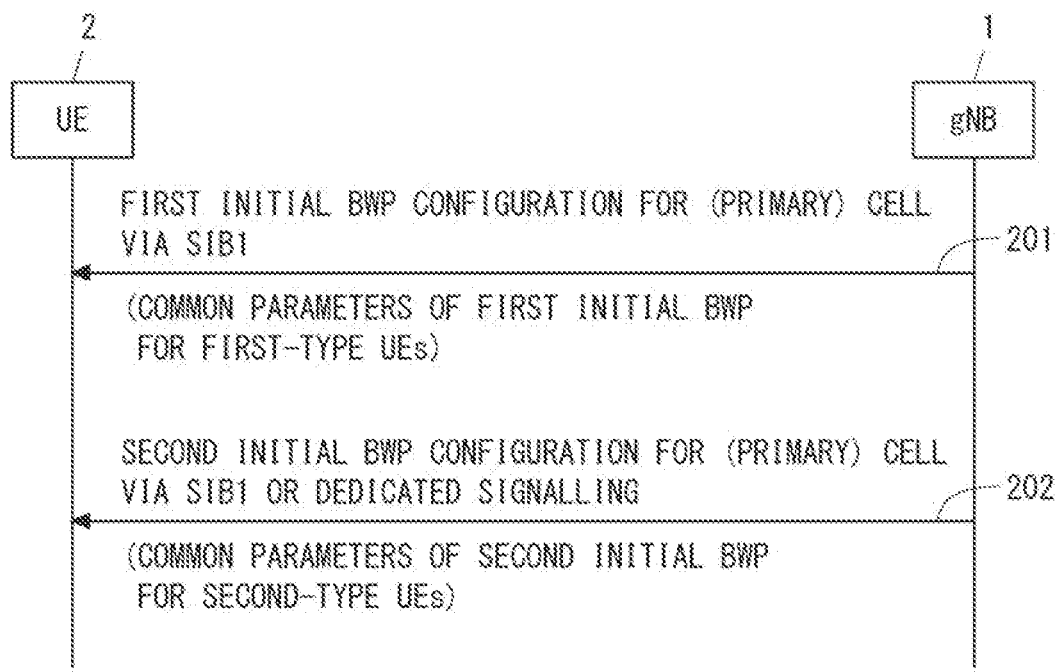
FIG. 2 is a sequence diagram showing an example of operations of a gNB and a UE according to an embodiment.

FIG. 2 shows an example of operations of the gNB 1 and the UE 2. In step 201, the gNB 1 broadcasts the first initial BWP configuration via system information (e.g., SIB1). In step 202, the gNB 1 broadcasts the second initial BWP configuration via the system information (e.g., SIB1), or transmits the second initial BWP configuration via UE dedicated signaling (e.g., via an RRC message).

Assume here that the UE 2 is the second type of UE. The UE 2 receives the system information (e.g., SIB1) containing the first initial BWP configuration (Step 201). In addition, the UE 2 receives the second initial BWP configuration via system information (e.g., SIB1) or via UE dedicated signaling (Step 202). Then, since the UE 2 is the second type of UE, the UE 2 uses the second initial BWP configuration.

As can be understood from the above description, in this embodiment, the gNB 1 configures the first initial BWP (i.e., initial DL and UL BWPs) and the second initial BWP (i.e., one or both of initial DL and UL BWPs) in the cell 10. The first type of UEs and the second type of UEs use the cell 10 as their serving cell and perform contention-based random access in the cell 10. The second initial BWP is not used by the first type of UEs, but is used by the second type of UEs. Further, the gNB 1 transmits the second initial BWP configuration, which indicates the cell-specific common parameters of the second initial BWP of the cell 10, in addition to the first initial BWP configuration, which indicates the cell-specific common parameters of the first initial BWP of the cell 10. The second type of UEs select and use the second initial BWP. Accordingly, this embodiment allows the second type of UEs with limited capability compared to the first type of UEs to use initial BWPs suitable for their capability in the cell 10.

Second Embodiment

This embodiment provides a specific example of the transmission of the first and second initial BWP configurations described in the first embodiment. An example of a configuration of a radio communication network according to this embodiment is similar to that shown in FIG. 1.

In this embodiment, the gNB 1 broadcasts both the first and second initial BWP configurations via system information (e.g., SIB1). If the UE 2 is the second type of UE, the UE 2 selects the second initial BWP configuration from the received system information and applies the selected second initial BWP configuration. The definitions and uses of the first and second initial BWPs are similar to those in the examples described in the first embodiment. Specific examples of the first and second initial BWP configurations are also similar to the examples described in the first embodiment.

Figure 3:
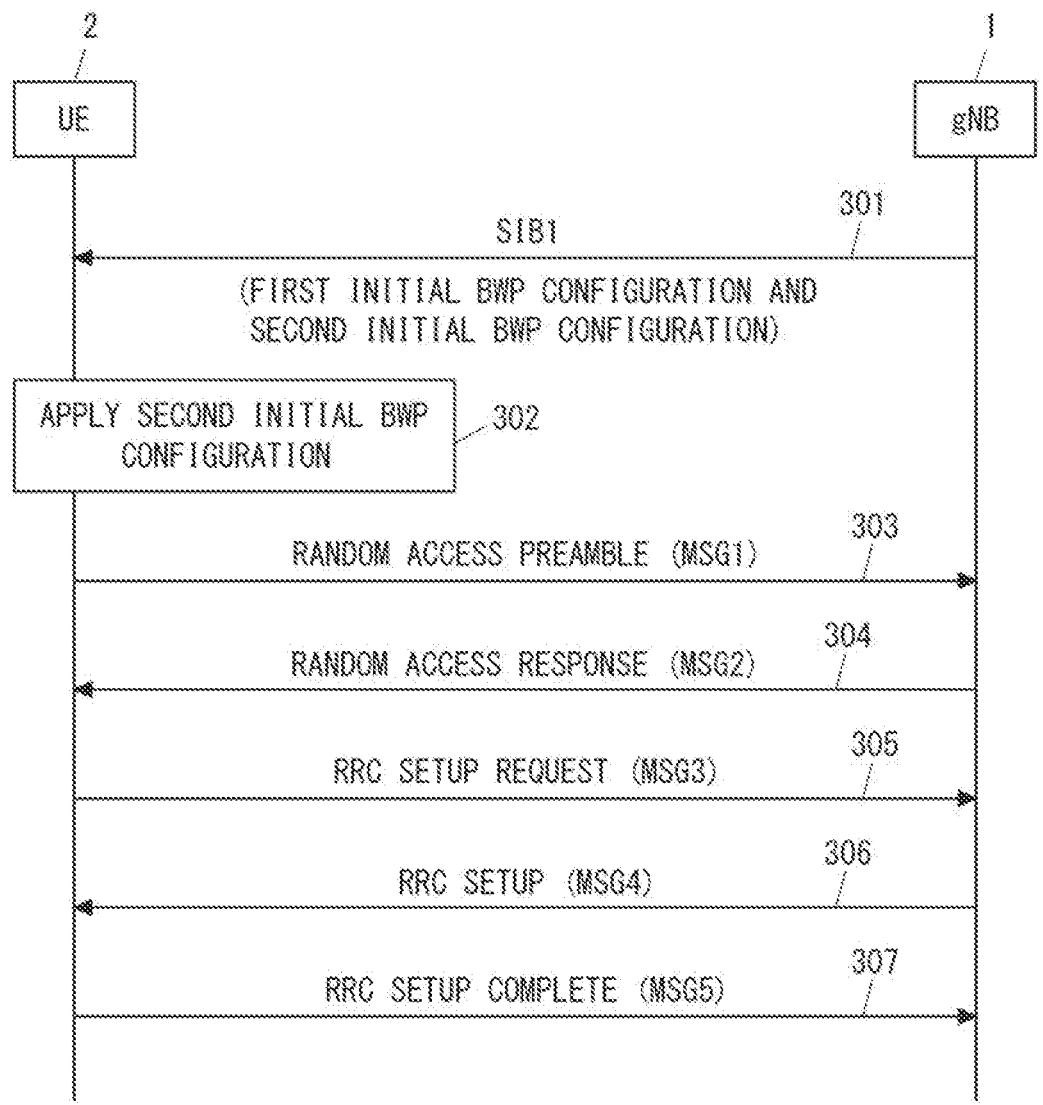
FIG. 3 is a sequence diagram showing an example of operations of a gNB and a UE according to an embodiment.

FIG. 3 shows an example of operations of the gNB 1 and the UE 2 according to this embodiment. It is assumed here that the UE 2 is the second type of UE. In step 301, the gNB 1 broadcasts both the first and second initial BWP configurations via system information (e.g., SIB1). The second initial BWP configuration may be defined as a new branch of one or more of a ServingCellConfigCommonSIB information element, DownlinkConfigCommonSIB information element, BWP-DownlinkCommon information element, UplinkConfigCommonSIB information element, and BWP-UplinkCommon information element contained in the SIB1. In other words, new versions of these information elements may be specified that contain at least part of the configuration information (or parameters) contained in these information elements and that include configurations related to the second initial BWP configuration.

In step 302, if the UE 2 is the second type of UE, the UE 2 selects the second initial BWP configuration from the received system information and applies the selected second initial BWP configuration.

In steps 303 to 307, the UE 2 performs a random access procedure (4-Step Random Access (RA)) by using the second initial BWP configuration, and initiates an RRC setup procedure to transition from the RRC_IDLE state to the RRC_CONNECTED state.

In some implementations, the UE 2 may select a random access preamble transmitted in step 303 according to random access parameters contained in the second initial BWP configuration. For example, the UE 2 may transmit a random access preamble based on the configurations of the second initial UL BWP.

Additionally or alternatively, in step 304, the UE 2 may monitor a common search space configured by PDCCH parameters contained in the second initial BWP configuration to receive a DCI format indicating PDSCH resources on which a random access response (Msg2) is scheduled. Additionally or alternatively, in step 304, the UE 2 may monitor PDSCH resources configured by PDSCH parameters contained in the second initial BWP configuration to receive a random access response (Msg2) via a PDSCH.

Additionally or alternatively, in step 305, the UE 2 may transmit a third message (Msg3) (e.g., initial RRC message (e.g., RRC Setup Request)) via a Physical Uplink Shared Channel (PUSCH) according to Physical Uplink Shared Channel (PUSCH) parameters contained in the second initial BWP configuration.

Additionally or alternatively, in step 306, the UE 2 may monitor a common search space configured by PDCCH parameters contained in the second initial BWP configuration to receive a DCI format indicating PDSCH resources on which a fourth message (Msg4) for contention resolution (e.g., a Contention Resolution MAC Control Element (CE) and an RRC message (e.g., RRC Setup)) is scheduled. Additionally or alternatively, in step 306, the UE 2 may monitor PDSCH resources configured by PDSCH parameters contained in the second initial BWP configuration to receive the fourth message (Msg4) via a PDSCH. Then, in response to receiving the fourth message (Msg4) (or after receiving the Msg4), the UE 2 may use the second initial BWP as the first active BWP.

Additionally or alternatively, in step 307, the UE 2 may transmit a fifth message (Msg5) (e.g., an RRC message indicating the completion of the random access procedure (4 Step RA) (e.g., RRC Setup Complete)) via a PUSCH, according to PUSCH parameters contained in the second initial BWP configuration.

Additionally or alternatively, the UE 2 may monitor PDSCH resources configured by PDSCH parameters contained in the second initial BWP configuration in order to receive, on a PDSCH, DL signaling and DL RRC messages that take place later than the RRC Setup message in step 306.

Although FIG. 3 shows an example of RRC setup (or RRC establishment), the transmission of the second initial BWP configuration via system information can also be used for RRC resume (Msg3: RRC Resume Request, Msg4: RRC Resume, and Msg5: RRC Resume Complete) and for RRC re-establishment (Msg3: RRC Reestablishment Request, and Msg4: RRC Reestablishment).

According to the procedure shown in FIG. 3, the gNB 1 applies the second initial BWP configuration to the second type of UEs via system information. Accordingly, the second type of UEs can use the second initial BWP configuration before starting the random access procedure.

In the procedure shown in FIG. 3, the second initial BWP configuration broadcast in step 301 may imply the support for the second type of UEs (e.g., reduced capability UEs) in the cell 10. If the second initial BWP configuration cannot be received in a cell, the second type of UEs may recognize that access to that cell is barred.

In the transmission of step 305 in FIG. 3, the UE 2 may indicate, to the gNB 1, a specific logical channel ID (LCID) associated with the second type of UEs (e.g., reduced capability UEs). Based on the reception of such specific LCID, the gNB 1 can identify (or detect) that the UE 2 is the second type of UE. Additionally or alternatively, in the transmission of step 307 in FIG. 3, the UE 2 may include, in the RRC Setup Complete message, an indication indicating that it is the second type of UE. Based on the reception of such indication, the gNB 1 can identify (or detect) that the UE 2 is the second type of UE. Additionally or alternatively, in or after step 305, the gNB 1 may receive UE capability information from the UE 2 or the core network (e.g., Access and Mobility Management Function (AMF) in 5G Core Network (5GC)), and identify (or detect) that the UE 2 is the second type of UE based on the UE capability information. In response to detecting that the UE 2 is the second type of UE, the gNB 1 may transmit UE-specific configurations (including a dedicated BWP configuration), which are specific to the capability of the UE 2, to the UE 2 via dedicated signaling (e.g., an RRC Reconfiguration message).

Figure 4:
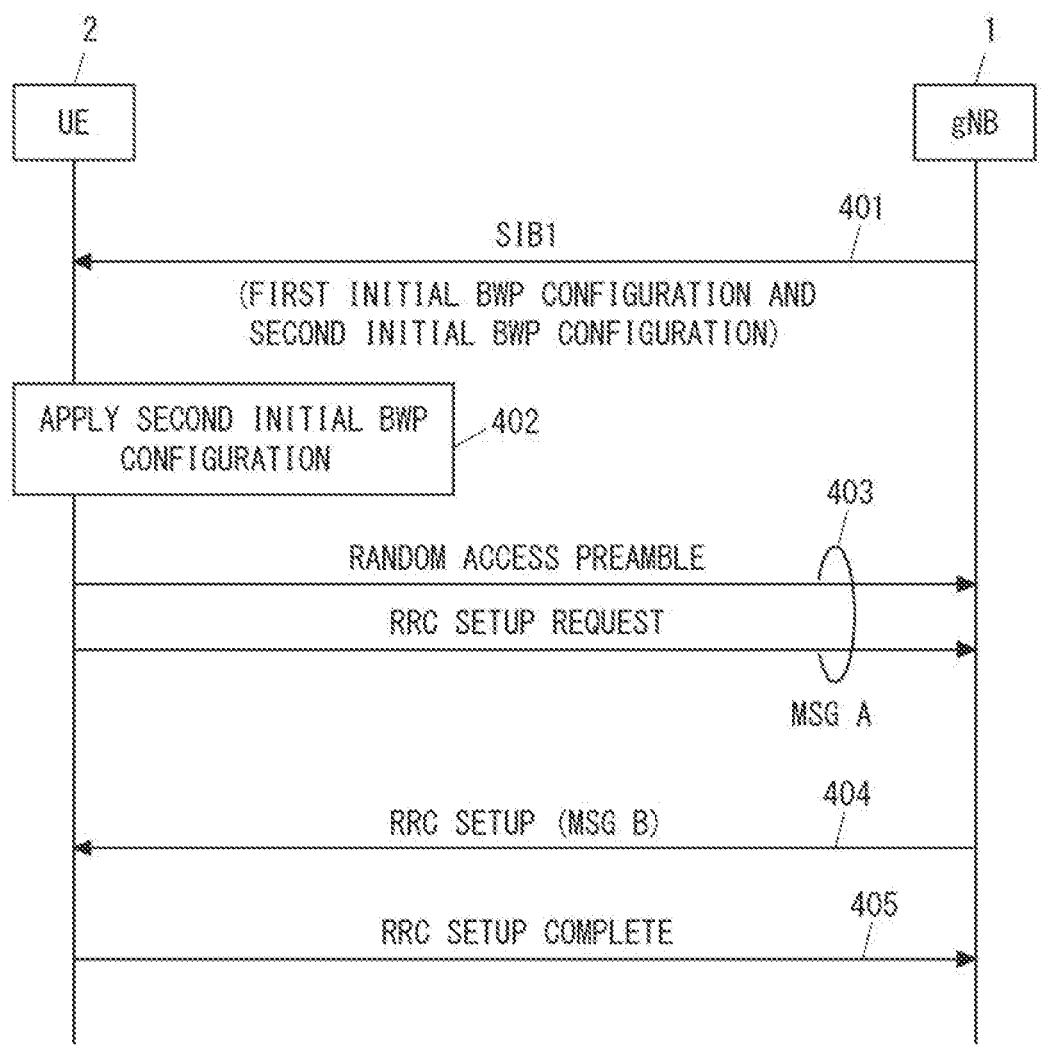
FIG. 4 is a sequence diagram showing an example of operations of a gNB and a UE according to an embodiment.

FIG. 4 shows another example of operations of the gNB 1 and the UE 2 according to this embodiment. It is assumed here that the UE 2 is the second type of UE. The example of FIG. 4 differs from the example of FIG. 3 in that a 2-step random access procedure (2-Step RA) is performed instead of a 4-step random access procedure (4-Step RA). Similarly to step 301 in FIG. 3, in step 401, the gNB 1 broadcasts both the first and second initial BWP configurations via system information (e.g., SIB1).

In step 402, if the UE 2 is the second type of UE, the UE 2 selects the second initial BWP configuration from the received system information and applies the selected second initial BWP configuration.

In steps 403 to 405, the UE 2 performs a 2-step random access procedure (2-Step RA) by using the second initial BWP configuration, and initiates an RRC setup procedure to transition from the RRC_IDLE state to the RRC_CONNECTED state.

In some implementations, the UE 2 may select a random access preamble of a message A (MsgA) of the 2-Step RACH transmitted in step 403 according to random access parameters contained in the second initial BWP configuration. For example, the UE 2 may transmit a random access preamble based on the configurations of the second initial UL BWP. Additionally or alternatively, in step 403, the UE 2 may transmit a data part (or payload) (e.g., initial RRC message (e.g., RRC Setup Request)) of the message A (MsgA) of the 2-Step RA according to Physical Uplink Shared Channel (PUSCH) parameters contained in the second initial BWP configuration.

Additionally or alternatively, in step 404, the UE 2 may monitor a common search space configured by PDCCH parameters contained in the second initial BWP configuration to receive a DCI format indicating PDSCH resources on which a random access response (Message B (MsgB)) (e.g., a Contention Resolution MAC CE and an RRC message (e.g., RRC Setup)) of the 2-Step RA is scheduled. Additionally or alternatively, in step 404, the UE 2 may monitor PDSCH resources configured by PDSCH parameters contained in the second initial BWP configuration to receive the random access response (MsgB) of the 2-Step RA via a PDSCH.

Additionally or alternatively, in step 405, the UE 2 may transmit, for example, an RRC message (e.g., RRC Setup Complete) indicating the completion of the 2-Step random access procedure via a PUSCH according to PUSCH parameters contained in the second initial BWP configuration.

Although FIG. 4 shows an example of RRC setup (or RRC establishment), the transmission of the second initial BWP configuration via system information can also be used for RRC resume and RRC re-establishment.

Third Embodiment

This embodiment provides a specific example of the transmission of the first and second initial BWP configurations described in the first embodiment. An example of a configuration of a radio communication network according to this embodiment is similar to that shown in FIG. 1. The definitions and uses of the first and second initial BWPs in this embodiment are similar to those in the examples described in the first embodiment. Specific examples of the first and second initial BWP configurations are also similar to the examples described in the first embodiment.

In this embodiment, the gNB 1 broadcasts the first initial BWP configuration via system information (e.g., SIB1), while it transmits the second initial BWP configuration to the second type of UE via an RRC message (e.g., RRC Setup) during a contention-based random access (CBRA) procedure. If the UE 2 is the second type of UE, the UE 2 receives the first initial BWP configuration via the system information (e.g., SIB1) and receives the second initial BWP configuration via an RRC message (e.g., RRC Setup) during the CBRA procedure. In response to receiving the second initial BWP configuration, the UE 2 applies the second initial BWP configuration in place of the first initial BWP configuration (i.e., updates the initial BWP configuration used).

Figure 5:
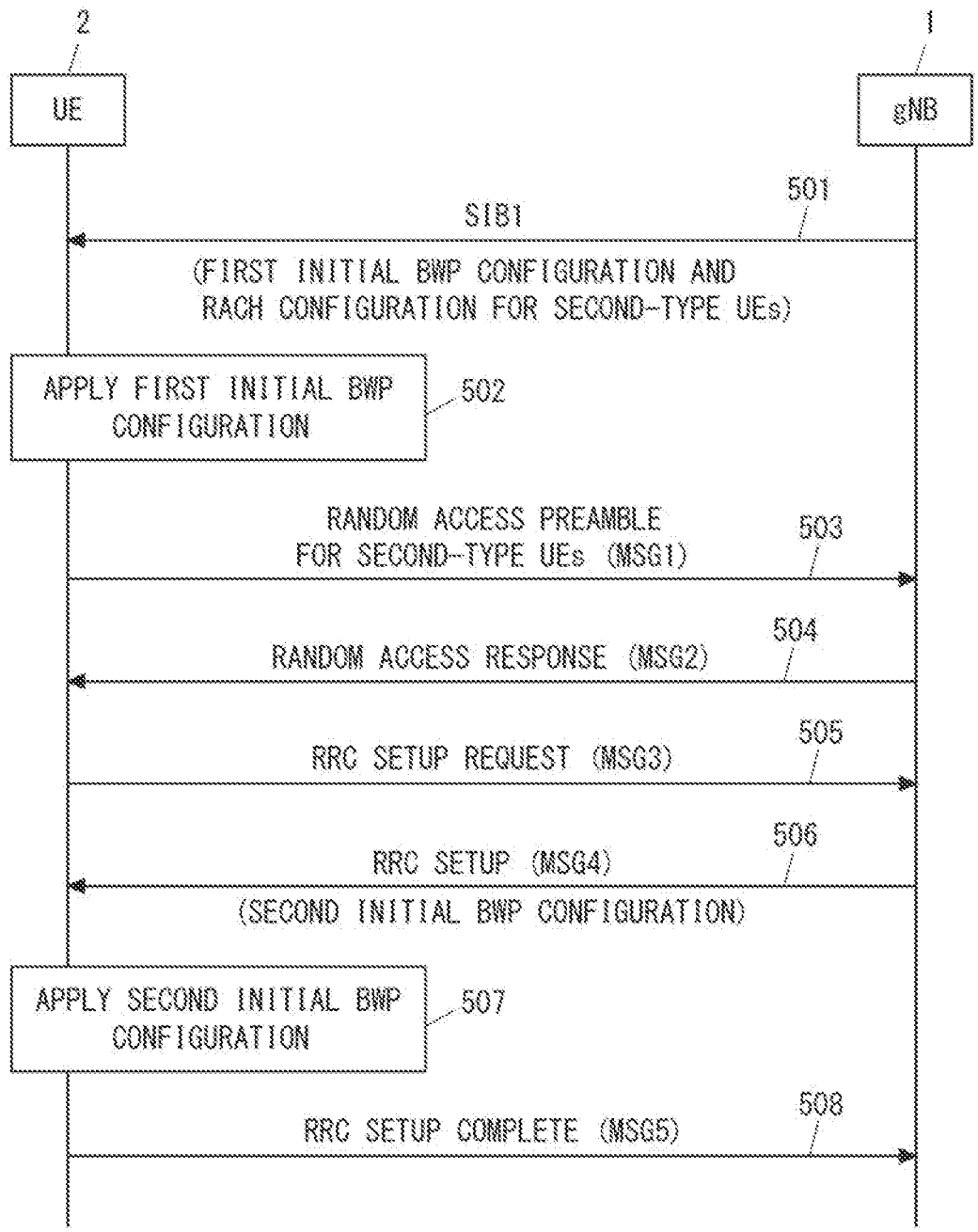
FIG. 5 is a sequence diagram showing an example of operations of a gNB and a UE according to an embodiment.

FIG. 5 shows an example of operations of the gNB 1 and the UE 2 according to this embodiment. It is assumed here that the UE 2 is the second type of UE. In step 501, the gNB 1 broadcasts the first initial BWP configuration via system information (e.g., SIB1). The gNB 1 further broadcasts, via the system information, Random Access Channel (RACH) configurations used in a random access procedure (4-Step RA) for the second type of UEs. The RACH configurations indicate specific RACH resources (i.e., preambles or occasions or both) for the second type of UEs. The broadcasting of the RACH configurations implies the support for the second type of UEs (e.g., reduced capability UEs) in the cell 10.

In step 502, the UE 2 receives the system information from the gNB 1 and applies the received first initial BWP configuration. In step 503, the UE 2 selects a RACH resource based on the Random Access Channel (RACH) configurations for the second type of UEs and transmits a random access preamble to the gNB 1. In response to that random access preamble, the gNB 1 detects access from the second type of UE. In step 504, the gNB 1 transmits a random access response (Msg2). In step 505, the UE 2 transmits a third message (Msg3) (e.g., initial RRC message (e.g., RRC Setup Request)) to the gNB 1.

In step 506, the gNB 1 transmits a fourth message (Msg4) (e.g., a Contention resolution MAC CE for contention resolution, and an RRC Setup message) to the UE 2. This RRC Setup message includes the second initial BWP configuration. Specifically, the gNB 1 includes the second initial BWP configuration into the RRC Setup message if it identifies (or detects) via the RACH resource (Step 503) that the UE 2 is the second type of UE. In step 507, in response to receiving the second initial BWP configuration, the UE 2 applies the second initial BWP configuration in place of the first initial BWP configuration (i.e., updates the initial BWP configuration used). Then, in response to receiving the fourth message (Msg4) (or after receiving the Msg4), the UE 2 may use the second initial BWP as the first active BWP. In step 508, the UE 2 transmits an RRC Setup Complete message to the gNB 1 according to the second initial BWP configuration.

The procedure in FIG. 5 can be modified as appropriate. For example, the procedure in FIG. 5 may be modified to perform a 2-step random access procedure (2-Step RA) instead of the 4-step random access procedure (4-Step RA). In this case, the gNB 1 may transmit an RRC message (e.g., RRC Setup) including the second initial BWP configurations as a random access response (Message B (MsgB)) of the 2-Step RA.

Figure 6:
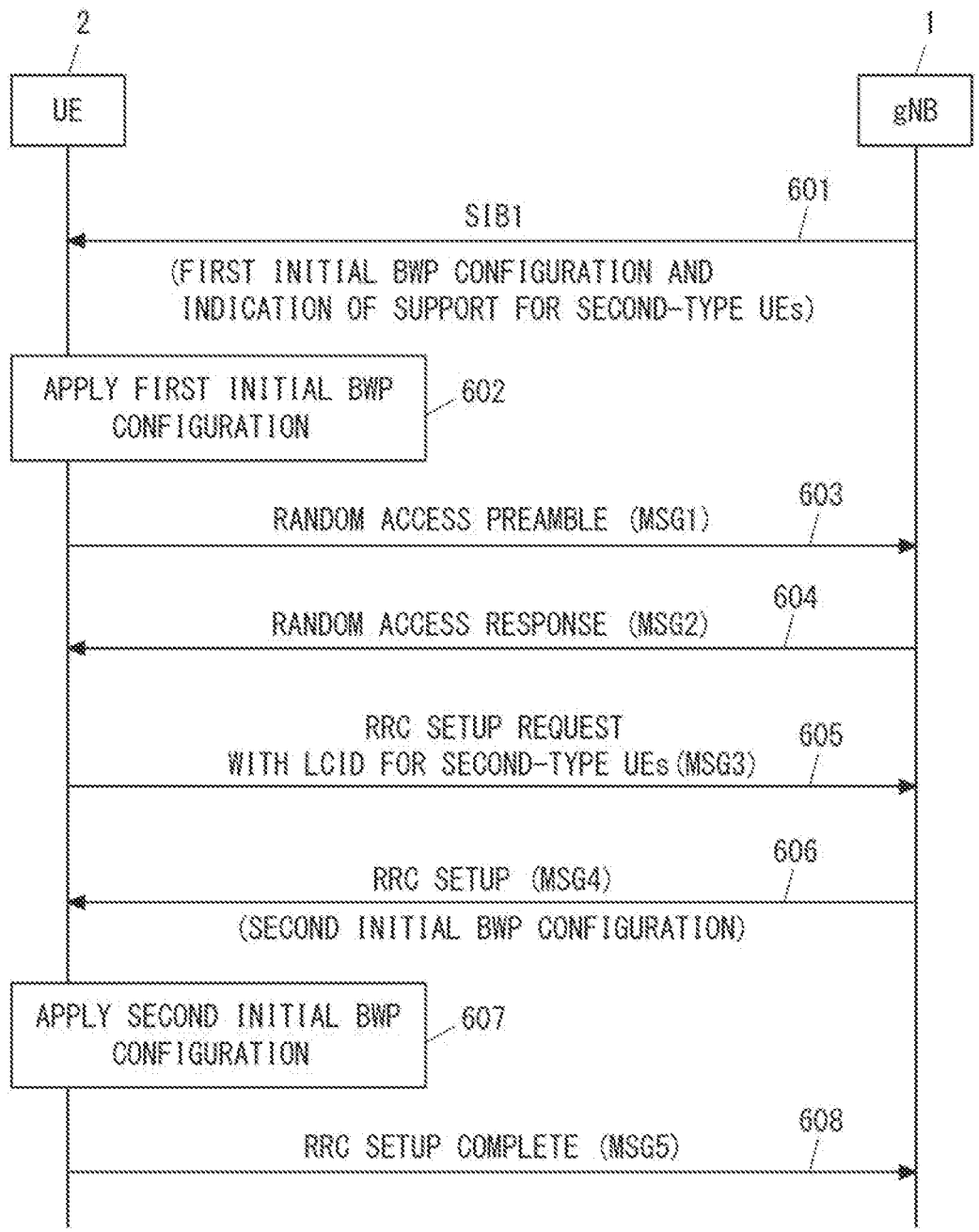
FIG. 6 is a sequence diagram showing an example of operations of a gNB and a UE according to an embodiment.

FIG. 6 shows another example of operations of the gNB 1 and the UE 2 according to this embodiment. The procedure in FIG. 6 differs from the procedure in FIG. 5 in that a specific logical channel ID (LCID) associated with the second type of UEs (e.g., reduced capability UEs) is used to inform the gNB 1 that the UE 2 is the second type of UE.

In step 601, the gNB 1 broadcasts the first initial BWP configuration via system information (e.g., SIB1). The gNB 1 further broadcasts an indication of the support for the second type of UEs via the system information. In step 602, the UE 2 receives the system information from the gNB 1 and applies the received first initial BWP configuration. In step 603, the UE 2 transmits a random access preamble to the gNB 1. In step 604, the gNB 1 transmits a random access response (Msg2). In step 605, the UE 2 transmits a third message (Msg3) (e.g., initial RRC message (e.g., RRC Setup Request)) to the gNB 1. In the transmission of step 605, the UE 2 indicates, to the gNB 1, a specific logical channel ID (LCID) associated with the second type of UEs (e.g., reduced capability UEs). The specific LCID may be, for example, a pre-defined LCID to be used for a Common Control CHannel (CCCH). Based on the reception of the specific LCID, the gNB 1 identifies (or detects) that the UE 2 is the second type of UE.

In step 606, the gNB 1 transmits a fourth message (Msg4) (e.g., a Contention resolution MAC CE for contention resolution, and an RRC Setup message) to the UE 2. This RRC Setup message includes the second initial BWP configuration. Specifically, if the gNB 1 identifies (or detects) that the UE 2 is the second type of UE via the specific LCID associated with the second type of UEs, it includes the second initial BWP configuration into the RRC Setup message. In step 607, in response to receiving the second initial BWP configuration, the UE 2 applies the second initial BWP configuration in place of the first initial BWP configuration (i.e., updates the initial BWP configuration used). In step 608, the UE 2 transmits an RRC Setup Complete message to the gNB 1 according to the second initial BWP configuration.

The procedure in FIG. 6 can be modified as appropriate. For example, the procedure in FIG. 6 may be modified to perform a 2-step random access procedure (2-Step RA) instead of the 4-step random access procedure (4-Step RA). In this case, the gNB 1 may transmit an RRC message (e.g., RRC Setup) including the second initial BWP configurations as a random access response (Message B (MsgB)) of the 2-Step RA.

It should be noted that the second initial BWP configuration sent to the UE 2 in step 506 of FIG. 5 and step 606 of FIG. 6 is a cell-specific common configuration of the initial BWP and not a UE-specific dedicated configuration. This second initial BWP configuration includes cell-specific common configurations of the second initial BWP corresponding to (at least a part of) the cell-specific common configuration of the first initial BWP. In other words, this second initial BWP configuration is transmitted by a UE-dedicated RRC message in step 506 of FIG. 5 and step 606 of FIG. 6, but is not a UE-specific dedicated configuration. The second initial BWP configuration sent in steps 506 and 606 includes cell-specific common parameters of the initial BWP. Specifically, this second initial BWP configuration may include parameters indicating the frequency-domain position and bandwidth of the initial DL BWP, or the frequency-domain position and bandwidth of the initial UL BWP, or both. Additionally or alternatively, this second initial BWP configuration may include the configuration of a Type0-PDCCH common search space set (search space #0) in the initial DL BWP. The Type0-PDCCH common search space set (search space #0) is monitored for the reception of a Type0-PDCCH for SIB1 decoding.

When the UE 2 has transitioned from the RRC_CONNECTED state to the RRC_IDLE or RRC_INACTIVE state after receiving the second initial BWP configuration, the UE 2 may retain the second initial BWP configuration and continue to use the second initial BWP configuration. For example, the UE 2 may continue to use the second initial BWP configuration while staying in the same cell 10. Further, when the UE 2 initiates an RRC Setup or RRC Resume procedure to transition from the RRC_IDLE or RRC_INACTIVE state to the RRC_CONNECTED state again in the same cell 10, the UE 2 may access the cell 10 using the stored second initial BWP configuration instead of using the first initial BWP configuration broadcast via SIB1. The UE 2 may perform these operations only when it has received information explicitly or implicitly indicating permission to perform these operations from the gNB 1 via an RRC message (e.g., RRC Setup, RRC Reconfiguration, or RRC Release) or SIB1.

Additionally or alternatively, if a new cell different from the cell 10 supports the second type of UEs, the UE 2 may access this new cell using the stored second initial BWP configuration instead of using the first initial BWP configuration broadcast via SIB1 of this new cell. The UE 2 may perform these operations only when it has received information explicitly or implicitly indicating permission to perform these operations from the gNB 1 via an RRC message or SIB1.

Fourth Embodiment

This embodiment provides a specific example of the transmission of the first and second initial BWP configurations described in the first embodiment. An example of a configuration of a radio communication network according to this embodiment is similar to that shown in FIG. 1. The definitions and uses of the first and second initial BWPs in this embodiment are similar to those in the examples described in the first embodiment. Specific examples of the first and second initial BWP configurations are also similar to the examples described in the first embodiment.

In this embodiment, the gNB 1 broadcasts the first initial BWP configuration via system information (e.g., SIB1), and transmits the second initial BWP configuration to the UE 2 via an RRC Reconfiguration message after the completion of RRC (connection) setup of the UE 2. If the UE 2 is the second type of UE, the UE 2 receives the first initial BWP configuration via the system information (e.g., SIB1) and receives the second initial BWP configuration via the RRC Reconfiguration message after the completion of RRC setup. In response to receiving the second initial BWP configuration, the UE 2 applies the second initial BWP configuration in place of the first initial BWP configuration (i.e., updates the initial BWP configuration used).

Figure 7:
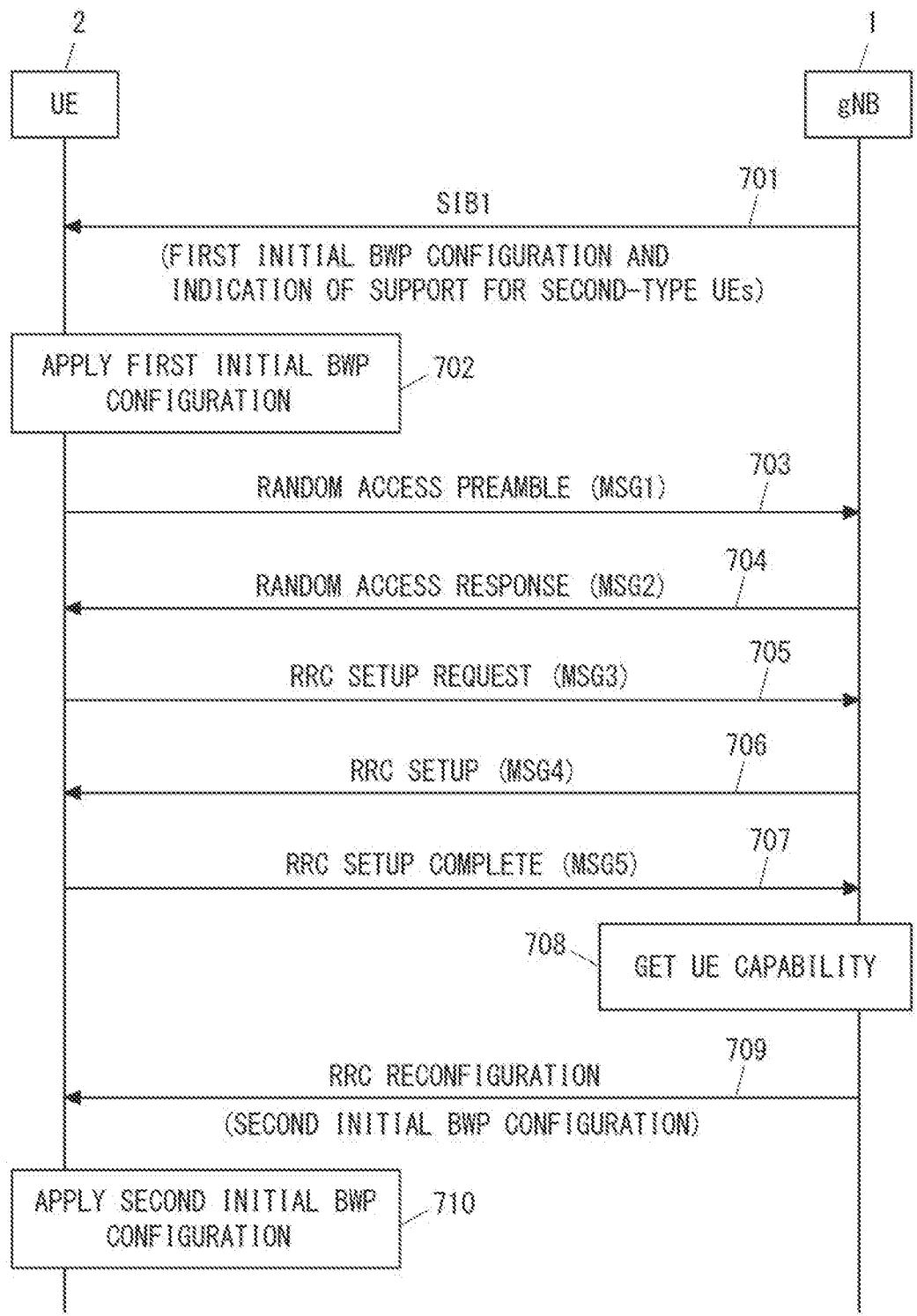
FIG. 7 is a sequence diagram showing an example of operations of a gNB and a UE according to an embodiment.

FIG. 7 shows an example of operations of the gNB 1 and the UE 2 according to this embodiment. It is assumed here that the UE 2 is the second type of UE. In step 701, the gNB 1 broadcasts the first initial BWP configuration via system information (e.g., SIB1). The gNB 1 further broadcasts an indication indicating the support for the second type of UEs via the system information.

Steps 702 to 707 are similar to normal contention-based random access (CBRA) and RRC Setup procedures. Specifically, in step 702, the UE 2 receives the system information from the gNB 1 and applies the received first initial BWP configuration. In step 703, the UE 2 transmits a random access preamble to the gNB 1. In step 704, the gNB 1 transmits a random access response (Msg2). In step 705, the UE 2 transmits a third message (Msg3) (e.g., initial RRC message (e.g., RRC Setup Request)) to the gNB 1. In step 706, the gNB 1 transmits a fourth message (Msg4) for contention resolution (e.g., a Contention Resolution MAC CE for contention resolution, and an RRC Setup message) to the UE 2. In step 707, the UE 2 transmits an RRC Setup Complete message to the gNB 1.

In step 708, the gNB 1 acquires UE capability information of the UE 2 from the UE 2 or the core network (e.g., an AMF in 5GC). The gNB 1 identifies (or detects) that the UE 2 is the second type of UE based on the acquired UE capability information. In response to identifying (or detecting) that the UE 2 is the second type of UE, the gNB 1 generates an RRC Reconfiguration message including the second initial BWP configuration. In step 709, the gNB 1 transmits the RRC Reconfiguration message including the second initial BWP configuration to the UE 2. In step 710, in response to receiving the second initial BWP configuration, the UE 2 applies the second initial BWP configuration in place of the first initial BWP configuration (i.e., updates the initial BWP configuration used).

The procedure shown in FIG. 7 can be modified as appropriate. For example, the procedure shown in FIG. 7 may be modified to perform a 2-step random access procedure (2-Step RA) instead of the 4-step random access procedure (4-Step RA).

It should be noted that the second initial BWP configuration sent to the UE 2 in step 709 is a cell-specific common configuration of the initial BWP and not a UE-specific dedicated configuration. This second initial BWP configuration includes cell-specific common configurations of the second initial BWP corresponding to (at least a part of) the cell-specific common configuration of the first initial BWP. In other words, this second initial BWP configuration is transmitted by a UE-dedicated RRC message in step 709, but is not a UE-specific dedicated configuration. The second initial BWP configuration sent in step 709 includes cell-specific common parameters of the initial BWP. Specifically, this second initial BWP configuration may include parameters indicating the frequency-domain position and bandwidth of the initial DL BWP, or the frequency-domain position and bandwidth of the initial UL BWP, or both. Additionally or alternatively, this second initial BWP configuration may include the configuration of a Type0-PDCCH common search space set (search space #0) in the initial DL BWP. The Type0-PDCCH common search space set (search space #0) is monitored for the reception of a Type0-PDCCH for SIB1 decoding.

When the UE 2 has transitioned from the RRC_CONNECTED state to the RRC_IDLE or RRC_INACTIVE state after receiving the second initial BWP configuration, the UE 2 may retain the second initial BWP configuration and continue to use the second initial BWP configuration. For example, the UE 2 may continue to use the second initial BWP configuration while staying in the same cell 10. Further, when the UE 2 initiates an RRC Setup or RRC Resume procedure to transition from the RRC_IDLE or RRC_INACTIVE state to the RRC_CONNECTED state again in the same cell 10, the UE 2 may access the cell 10 using the stored second initial BWP configuration instead of using the first initial BWP configuration broadcast via SIB1. The UE 2 may perform these operations only when it has received information explicitly or implicitly indicating permission to perform these operations from the gNB 1 via an RRC message (e.g., RRC Setup, RRC Reconfiguration, or RRC Release) or SIB1.

Additionally or alternatively, if a new cell different from the cell 10 supports the second type of UEs, the UE 2 may access this new cell using the stored second initial BWP configuration instead of using the first initial BWP configuration broadcast via SIB1 of this new cell. The UE 2 may perform these operations only when it has received information explicitly or implicitly indicating permission to perform these operations from the gNB 1 via an RRC message or SIB1.

Fifth Embodiment

An example of a configuration of a radio communication network according to this embodiment is similar to that shown in FIG. 1. The definitions and uses of the first and second initial BWPs in this embodiment are similar to those in the examples described in the first embodiment. Specific examples of the first and second initial BWP configurations are also similar to the examples described in the first embodiment. This embodiment provides a specific example of the operations of the UE 2 described in the third and fourth embodiments.

Figure 8:
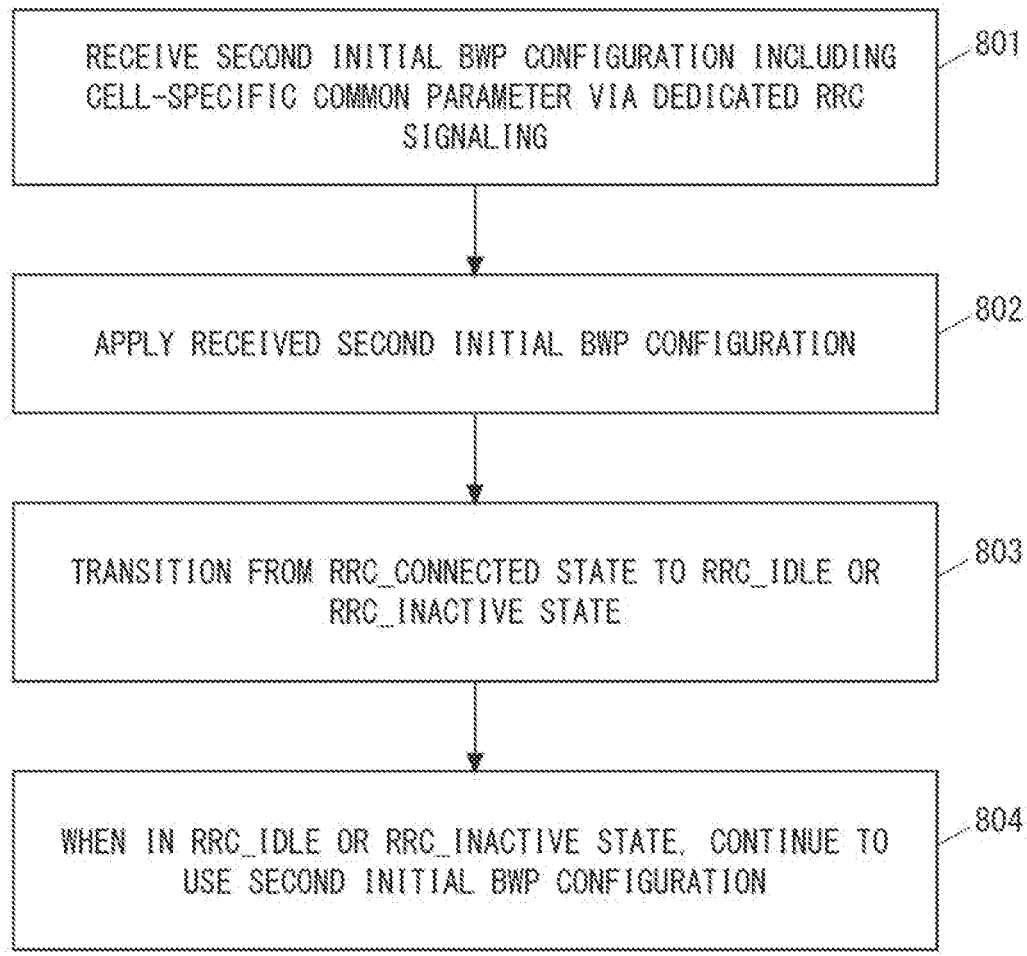
FIG. 8 is a sequence diagram showing an example of operations of a gNB and a UE according to an embodiment.

FIG. 8 shows an example of operations of the UE 2 according to this embodiment. In step 801, the UE 2 receives the second initial BWP configuration including cell-specific common parameters from the gNB 1 via dedicated RRC signaling. Step 801 is similar to step 506 in FIG. 5, step 606 in FIG. 6, or step 709 in FIG. 7. In step 802, the UE 2 applies the received second initial BWP configuration. In step 803, the UE 2 transitions from the RRC_CONNECTED state to the RRC_IDLE or RRC_INACTIVE state.

In step 804, when the UE 2 is in the RRC_IDLE or RRC_INACTIVE state after receiving the second initial BWP configuration, the UE 2 retains the second initial BWP configuration and continues to use the second initial BWP configuration. For example, the UE 2 may continue to use the second initial BWP configuration while staying in the same cell 10. Further, when the UE 2 initiates an RRC Setup or RRC Resume procedure to transition from the RRC_IDLE or RRC_INACTIVE state to the RRC_CONNECTED state again in the same cell 10, the UE 2 may access the cell 10 using the stored second initial BWP configuration instead of using the first initial BWP configuration broadcast via SIB1. The UE 2 may perform these operations only when it has received information explicitly or implicitly indicating permission to perform these operations from the gNB 1 via an RRC message (e.g., RRC Setup, RRC Reconfiguration, or RRC Release) or SIB1.

Additionally or alternatively, if a new cell different from the cell 10 supports the second type of UEs, the UE 2 may access this new cell using the stored second initial BWP configuration instead of using the first initial BWP configuration broadcast via SIB1 of this new cell. The UE 2 may perform these operations only when it has received information explicitly or implicitly indicating permission to perform these operations from the gNB 1 via an RRC message or SIB1.

According to the operations shown in FIG. 8, when transitioning from the RRC_IDLE or RRC_INACTIVE state to the RRC_CONNECTED state again, the second type of UE can use the second initial BWP configuration that it has already received when it was in the RRC_CONNECTED state in the past.

Sixth Embodiment

An example of a configuration of a radio communication network according to this embodiment is similar to that shown in FIG. 1. The definitions and uses of the first and second initial BWPs in this embodiment are similar to those in the examples described in the first embodiment. Specific examples of the first and second initial BWP configurations are also similar to the examples described in the first embodiment. This embodiment provides a specific example of the operations of the gNB 1 and the UE 2 described in the third and fourth embodiments.

In this embodiment, the RAN including the gNB 1 defines cells or areas where the UE 2 is allowed to continue to use the second initial BWP received when the UE 2 was in the RRC_CONNECTED state, even after it transitions from the RRC_CONNECTED state to the RRC_IDLE or RRC_INACTIVE state.

Figure 9:
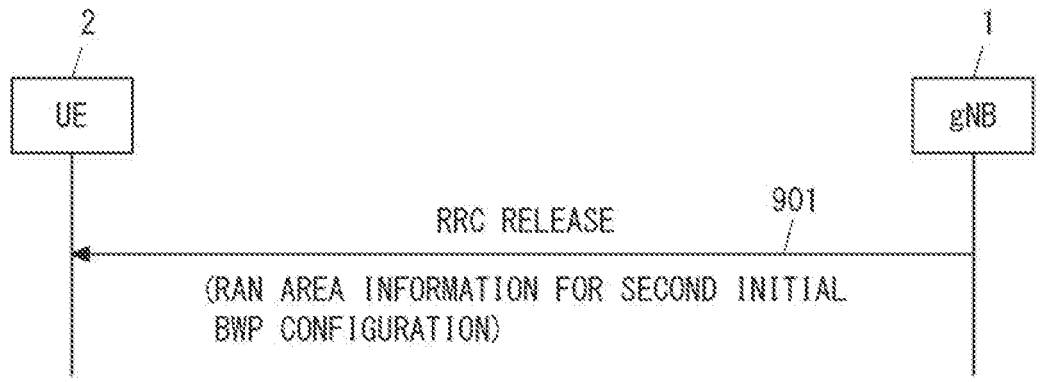
FIG. 9 is a sequence diagram showing an example of operations of a gNB and a UE according to an embodiment.

FIG. 9 shows an example of operations of the gNB 1 according to this embodiment. When the gNB 1 releases an RRC connection with the UE 2, the gNB 1 sends RAN area information to the UE 2 indicating cells or areas in which the UE 2 is allowed to continue using the second initial BWP configuration even after the UE 2 transitions from the RRC_CONNECTED state to the RRC_IDLE or RRC_INACTIVE state (Step 901). The gNB 1 may include this RAN area information in an RRC Release message (e.g., a SuspendConfig in an RRC Release message). Other RRC messages (e.g., RRC Reconfiguration) may be used instead of the RRC Release message. The RAN area information may indicate a list of cells or a list of RAN area codes. In this case, a new RAN area code (ranac) may be defined as ranac-ReducedCapability (RedCap). The configuration of the RAN Notification Area (RNA) may be reused if the RAN area information indicates cells or areas where the second initial BWP is allowed to continue to be used in the RRC_INACTIVE state. In this case, this RNA may be newly defined as RNA-ReducedCapability (RedCap).

Figure 10:
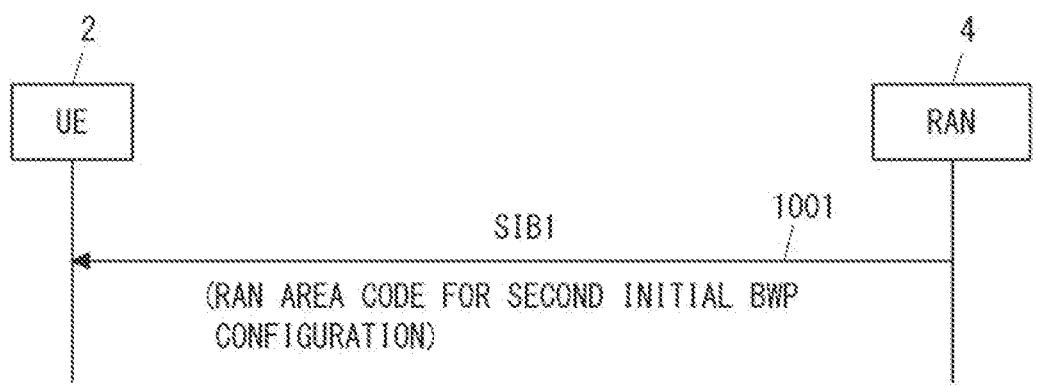
FIG. 10 is a sequence diagram showing an example of operations of a RAN and a UE according to an embodiment.

FIG. 10 shows an example of operations of a RAN 4 according to this embodiment. The gNB 1 and other gNBs supporting the second type of UEs belonging to the RAN 4 broadcast RAN area codes for the continued use of the second initial BWP configuration via system information (e.g., SIB1) (Step 1001).

Figure 11:
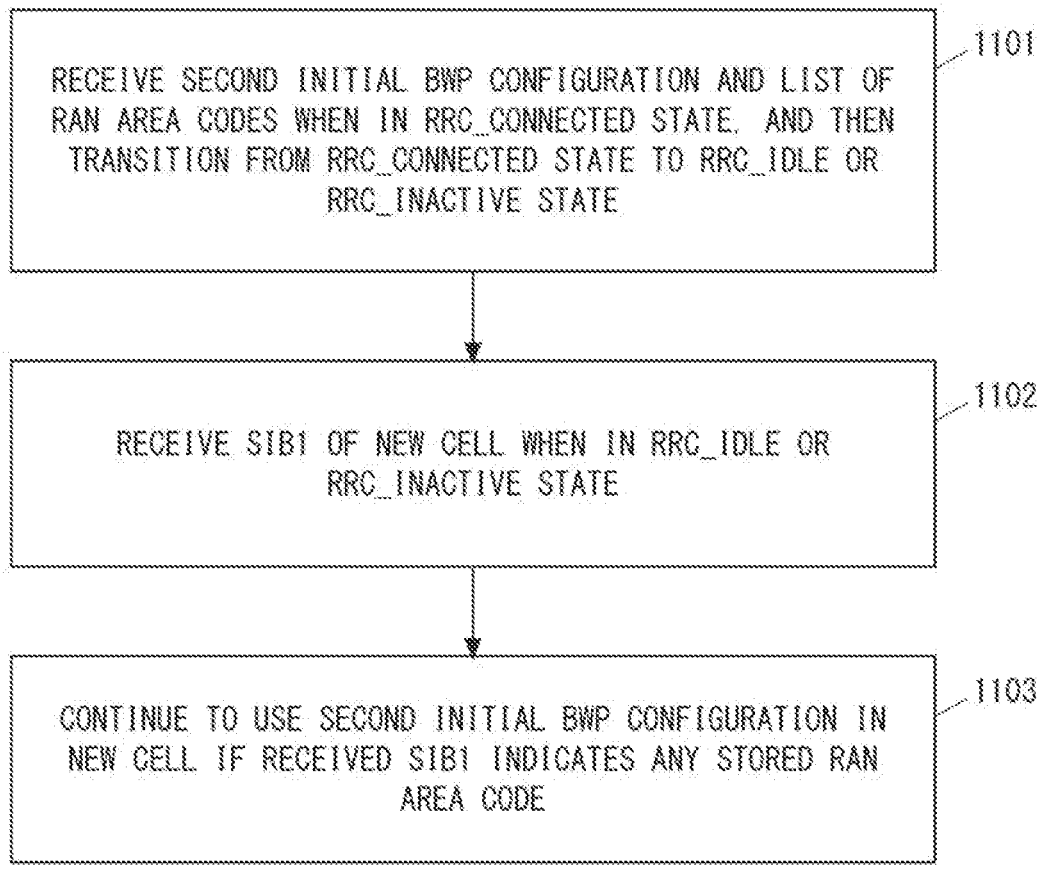
FIG. 11 is a flowchart showing an example of operations of a UE according to an embodiment.

FIG. 11 shows an example of operations of the UE 2 according to this embodiment. In step 1101, the UE 2 receives the second initial BWP configuration and a list of RAN area codes when it is in the RRC_CONNECTED state, and then transitions from the RRC_CONNECTED state to the RRC_IDLE or RRC_INACTIVE state. The list of RAN area codes indicates one or more RAN area codes that represent one or more RAN areas where the continued use of the second initial BWP configuration is allowed. The UE 2 stores and maintains the second initial BWP configuration and the list of RAN area codes in a memory.

In step 1102, the UE 2 receives SIB1 of a new cell when it is in the RRC_IDLE or RRC_INACTIVE state. This new cell may be provided by the same gNB 1 as the cell 10, or it may be provided by another gNB.

In step 1103, the UE 2 determines whether the SIB1 received from the new cell indicates one of one or more the stored RAN area codes. If the SIB1 of the new cell indicates one of the stored RAN area codes, the UE 2 continues to use the stored second initial BWP configuration in the new cell. For example, when the UE 2 initiates an RRC Setup or RRC Resume procedure to transition from the RRC_IDLE or RRC_INACTIVE state to the RRC_CONNECTED state again in the new cell, the UE 2 accesses the new cell by using the stored second initial BWP configuration instead of using the first initial BWP configuration broadcast via the SIB1.

The procedure shown in FIG. 11 may be modified as follows. In step 1101, the UE 2 may receive a list of one or more cells where the continued use of the second initial BWP configuration is allowed. In this case, the UE 2 may determine in step 1103 whether the new cell is included in this list based on the SIB1 received from the new cell.

According to this embodiment, if the UE 2 transitions from the RRC_CONNECTED state to the RRC_IDLE or RRC_INACTIVE state after receiving the second initial BWP configuration when it is in the RRC_CONNECTED state, the UE 2 can continue to use the second initial BWP configuration.

Seventh Embodiment

An example of a configuration of a radio communication network according to this embodiment is similar to that shown in FIG. 1. The definitions and uses of the first and second initial BWPs in this embodiment are similar to those in the examples described in the first embodiment. Specific examples of the first and second initial BWP configurations are also similar to the examples described in the first embodiment.

As described in the second and third embodiments, the UE 2 may indicate a specific logical channel ID (LCID) associated with second type of UEs (e.g., reduced capability UEs) to the gNB 1 in transmitting the third message (Msg3) (e.g., RRC Setup Request) in a random access procedure (e.g., RRC Setup procedure). Alternatively, the UE 2 may use a RACH resource associated with the second type of UEs in the random access preamble (Msg1) transmission in the random access procedure.

In the case of RRC resume (or an RRC connection resume procedure), the UE 2 may not use the indication of the second UEs via a RACH resource or LCID. This is because the gNB 1 can obtain the UE context stored in the gNB 1 or another gNB (e.g., gNB that moved the UE 2 to the RRC_INACTIVE state) and determine whether the UE 2 is the second type of UE based on this UE context. However, if the RRC resume for the UE 2 fails (e.g., because the gNB 1 failed to obtain the UE context successfully), the gNB 1 can fall back to setup of a new RRC connection and send an RRC Setup message to the UE 2 to establish a new RRC connection. In this case, the gNB 1 may not be able to determine whether the UE 2 is the second type of UE or not.

A similar issue could also occur in RRC re-establishment (or an RRC connection re-establishment procedure). This is because, in the case of RRC re-establishment, the gNB 1 can use the UE context stored in the gNB 1 and can determine whether the UE 2 is the second type of UE based on this UE context. However, if the RRC re-establishment for the UE 2 fails, the gNB 1 can fall back to setup of a new RRC connection and send an RRC Setup message to the UE 2 to establish a new RRC connection. In this case, the gNB 1 may not be able to determine whether the UE 2 is the second type of UE or not.

To address these issues, the UE 2 according to this embodiment transmits an RRC Setup Complete message including an indication of the second type (e.g., indication of limited capability) to the network (gNB), in response to receiving an RRC Setup message from the network (gNB) for the establishment of a new RRC connection even though the UE 2 has initiated an RRC Connection Resumption procedure or RRC Connection Reestablishment procedure. This allows the UE 2 to inform the network that it is the second type of UE when the network (gNB) falls back from the RRC resume or RRC re-establishment to the RRC connection establishment.

Figure 12:
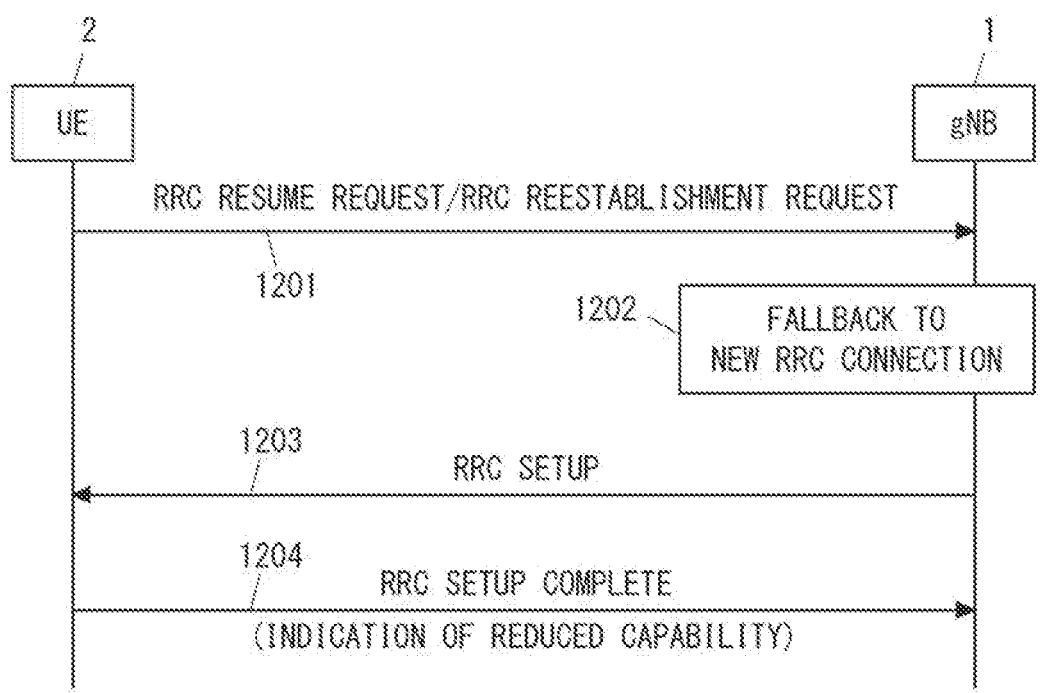
FIG. 12 is a sequence diagram showing an example of operations of a gNB and a UE according to an embodiment.

FIG. 12 shows an example of operations of the gNB 1 and the UE 2. In step 1201, the UE 2 transmits an RRC Resume Request message or RRC Reestablishment Request message to the gNB 1. In step 1202, the gNB 1 determines to fall back to the establishment of a new RRC connection. In step 1203, in response to this fallback, the gNB 1 transmits an RRC Setup message to the UE 2 instead of an RRC Resume message and an RRC reestablishment message. In step 1204, the UE 2 transmits an RRC Setup Complete message including an indication of the second type (e.g., indication of limited capability) to the gNB 1.

Eighth Embodiment

An example of a configuration of a radio communication network according to this embodiment is similar to that shown in FIG. 1. The definitions and uses of the first and second initial BWPs in this embodiment are similar to those in the examples described in the first embodiment. Specific examples of the first and second initial BWP configurations are also similar to the examples described in the first embodiment.

In this embodiment, cloud RAN (C-RAN) deployment is applied to the gNB 1. In the C-RAN, the gNB 1 consists of a Central Unit (CU) and one or more Distributed Units (DUs). The C-RAN is also referred to as Centralized RAN and as CU-DU split architecture.

Figure 13:
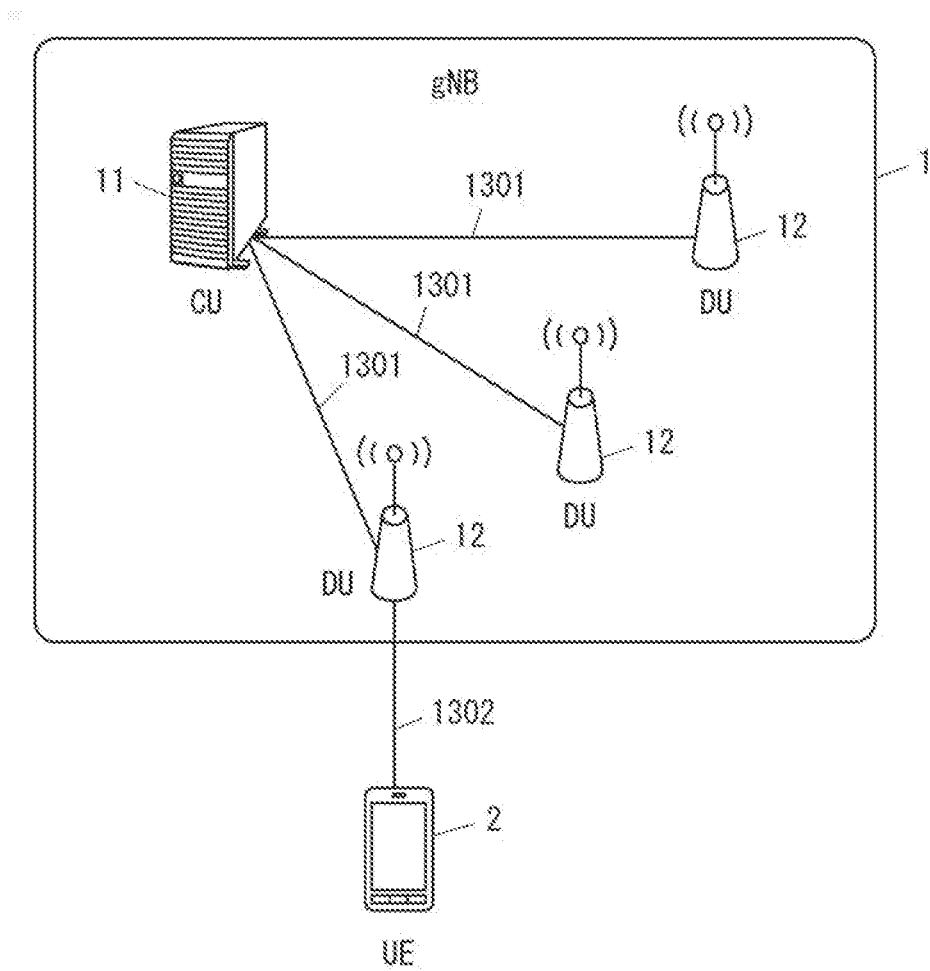
FIG. 13 shows an example of a configuration of a gNB according to an embodiment.

FIG. 13 shows an example of a configuration of the gNB 1 according to this embodiment. The gNB 1 shown in FIG. 13 includes a CU 11 and one or more DUs 12. The CU 11 is connected to each DU 12 via an interface 1301 (i.e., F1 interface). The UE 2 is connected to at least one DU 12 via at least one air interface 1302.

The CU 11 may be a logical node that hosts the Radio Resource Control (RRC), Service Data Adaptation Protocol (SDAP), and Packet Data Convergence Protocol (PDCP) protocols of the gNB 1 (or the RRC and PDCP protocols of the gNB). The CU 11 may include a Control Plane (CP) Unit (i.e., gNB-CU-CP) and one or more User Plane (UP) Units (i.e., gNB-CU-UPs). Each DU 12 may be a logical node that hosts the Radio Link Control (RLC), Medium Access Control (MAC), and Physical (PHY) layers of the gNB 1.

As described in the third embodiment, the UE 2 may inform the gNB 1 that the UE 2 is the second type of UE via a RACH resource associated with second type of UEs (Step 503 in FIG. 5) or via an LCID specific to the second type of UEs (Step 605 in FIG. 6). When the gNB 1 includes the CU 11 and one or more DUs 12 as shown in FIG. 13, one of the DUs 12 performs RACH resource detection and LCID detection, and the CU 11 generates an RRC Setup message containing the second initial BWP configuration (Step 506 in FIG. 5, or Step 606 in FIG. 6). Thus, signaling between the CU 11 and the DU 12 is required to enable this.

Figure 14:
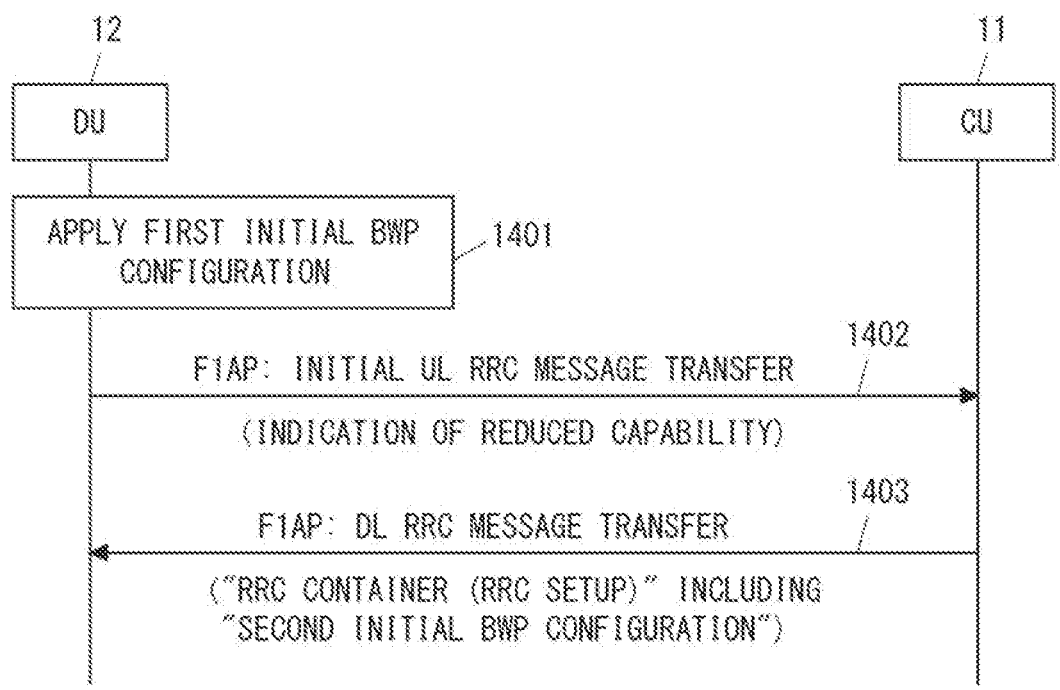
FIG. 14 is a sequence diagram showing an example of signaling according to an embodiment.

FIG. 14 shows an example of the signaling between the CU 11 and the DU 12. In step 1401, the DU 12 detects that the UE 2 is the second type of UE via a RACH resource associated with second type of UEs (e.g., Step 503 in FIG. 5) or via an LCID specific to the second type of UEs (e.g., Step 605 in FIG. 6).

In step 1402, the DU 12 sends to the CU 11 an F1AP message (i.e., INITIAL UL RRC MESSAGE TRANSFER message) containing an initial RRC message (e.g., RRC Setup Request) received from the UE 2. The DU 12 includes, in the INITIAL UL RRC MESSAGE TRANSFER message, an indication indicating that the UE 2 is the second type of UE. The indication may be, for example, an indication of limited capability. This indication may be defined as a new information element (e.g., Reduced Capability Indication information element (IE)) in the F1AP: INITIAL UL RRC MESSAGE TRANSFER message. Alternatively, this indication may be contained in a DU to CU RRC Container IE in the F1AP: INITIAL UL RRC MESSAGE TRANSFER message. More specifically, this indication may be defined as a new IE in the DU to CU RRC Container IE, or as a new IE or field contained in a CellGroupConfig IE within the DU to CU RRC Container IE.

In response to receiving the F1AP: INITIAL UL RRC MESSAGE TRANSFER message (Step 1402), the CU 11 receives the RRC Setup Request message from the UE 2 and identifies that the UE 2 is the second type of UE. In step 1403, the CU 11 generates an RRC Setup message containing the second initial BWP configuration and transmits an F1AP message (i.e., DL RRC MESSAGE TRANSFER message) containing this RRC Setup message to the DU 12. In response to receiving the DL RRC MESSAGE TRANSFER message (Step 1403), the DU 12 transmits the RRC Setup message containing the second initial BWP configuration to the UE 2.

Figure 15:
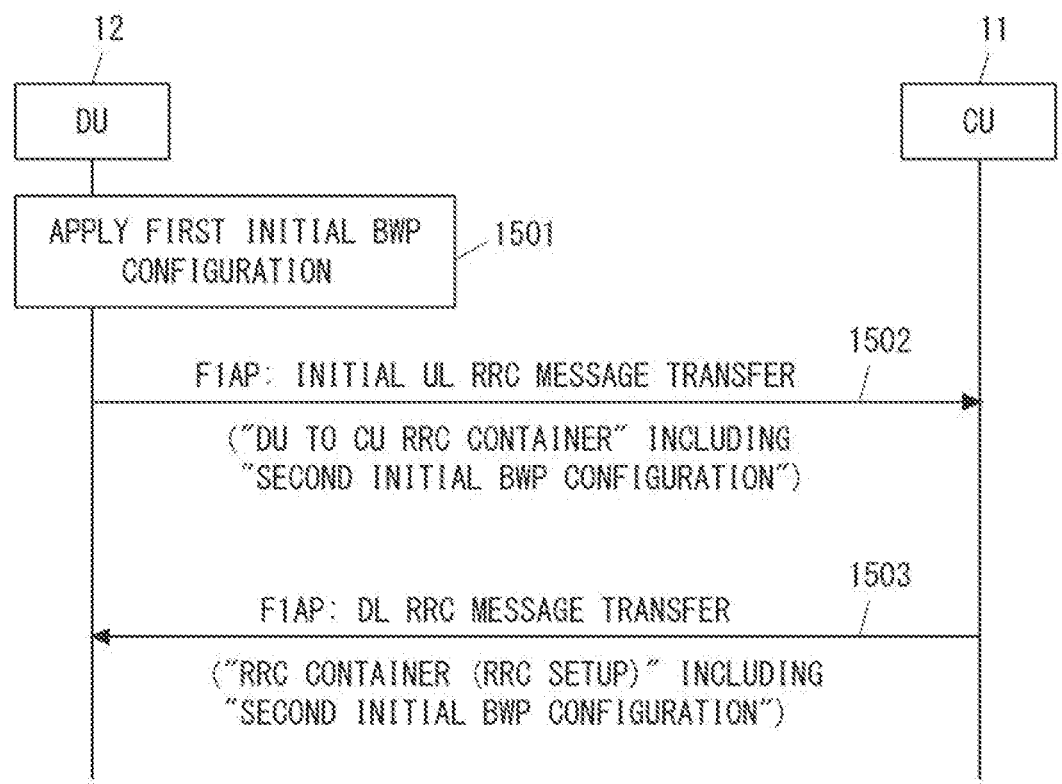
FIG. 15 is a sequence diagram showing an example of signaling according to an embodiment.

FIG. 15 shows another example of the signaling between the CU 11 and the DU 12. Step 1501 is similar to step 1401 in FIG. 14. In step 1502, the DU 12 sends, to the CU 11, an F1AP message (i.e., an INITIAL UL RRC MESSAGE TRANSFER message) containing an initial RRC message (e.g., RRC Setup Request) received from the UE 2. The DU 12 includes, in the INITIAL UL RRC MESSAGE TRANSFER message, an indication indicating that the UE 2 is the second type of UE. This indication may be, for example, an indication of limited capability. Further, the DU 12 generates the second initial BWP configuration and includes it in the INITIAL UL RRC MESSAGE TRANSFER message. Specifically, the DU 12 may generate a CellGroupConfig containing the second initial BWP configuration and include it in a DU to CU RRC Container IE in the INITIAL UL RRC MESSAGE TRANSFER message.

In response to receiving the F1AP: INITIAL UL RRC MESSAGE TRANSFER message (Step 1502), the CU 11 receives the RRC Setup Request message from the UE 2 and identifies that the UE 2 is the second type of UE. Further, the CU 11 receives the second initial BWP configuration (e.g., CellGroupConfig containing the second initial BWP configuration) generated by the DU 12. In step 1503, the CU 11 generates an RRC Setup message containing the second initial BWP configurations and transmits an F1AP message (i.e., a DL RRC MESSAGE TRANSFER message) containing this RRC Setup message to the DU 12. In response to receiving the DL RRC MESSAGE TRANSFER message (Step 1503), the DU 12 transmits the RRC Setup message containing the second initial BWP configuration to the UE 2.

Additionally or alternatively, the DU 12 may notify the CU 11 of the second initial BWP configuration information (Second Initial BWP Configuration) via an F1 SETUP REQUEST message or gNB-DU CONFIGURATION UPDATE message, and the CU 11 may store the received second initial BWP configuration information. When the UE 2 accesses the CU 11 via the DU 12, and the CU 11 recognizes that this UE 2 is a Reduced capability UE based on the UE Capability of the UE 2, the CU 11 may transmit the stored second initial BWP configuration information to the UE 2 via the DU 12. Alternatively, the DU 12 may transmit the second initial BWP configuration information to the CU 11 in another F1AP procedure. This F1AP procedure may be, for example, a UE associated F1AP procedure associated with a specific UE or a non-UE associated F1AP procedure.

Figure 16:
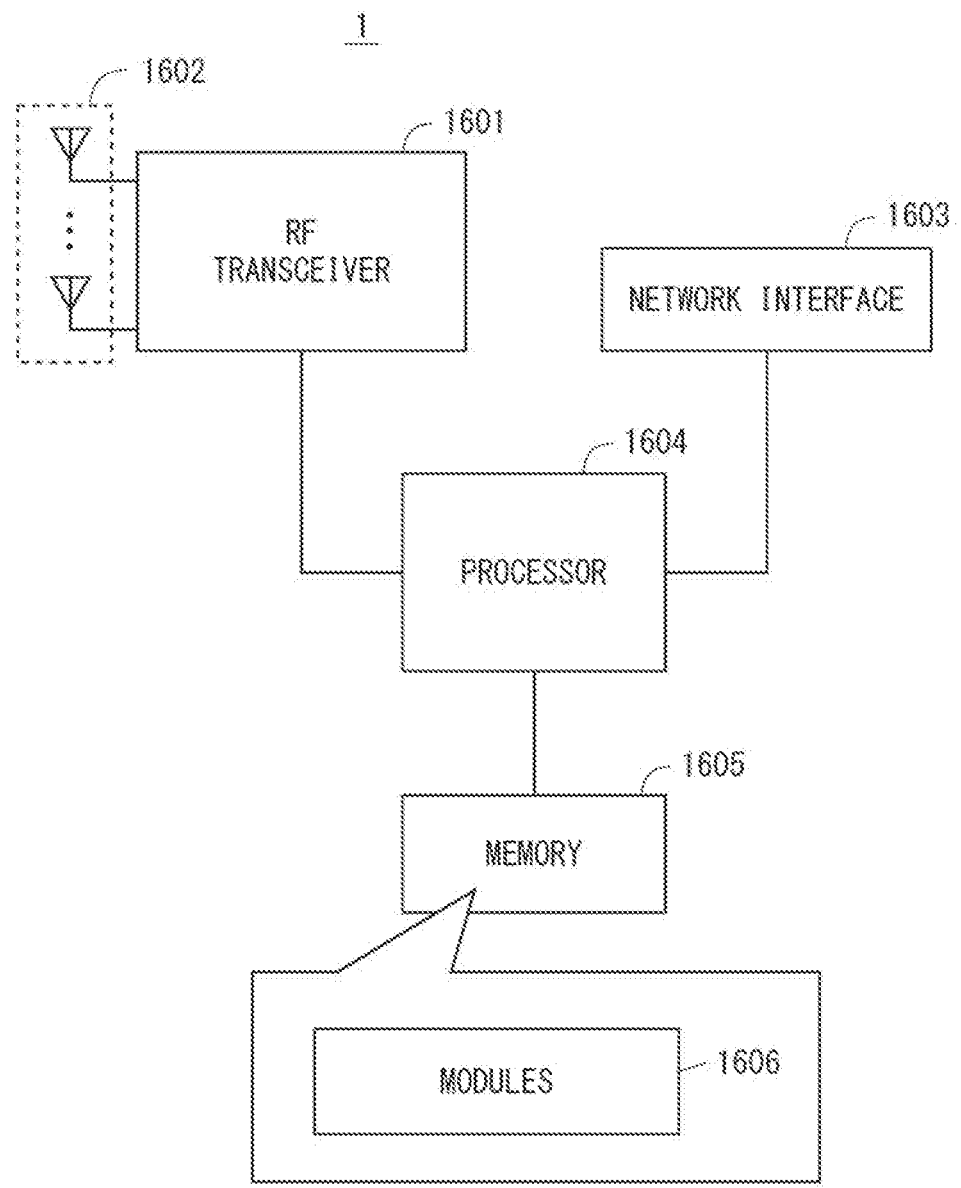
FIG. 16 is a block diagram showing an example of a configuration of a gNB according to an embodiment.

The following provides configuration examples of the gNB 1 and the UE 2 according to the above embodiments. FIG. 16 is a block diagram showing a configuration example of the gNB 1 according to the above embodiments. As shown in FIG. 16, the gNB 1 includes a Radio Frequency (RF) transceiver 1601, a network interface 1603, a processor 1604, and a memory 1605. The RF transceiver 1601 performs analog RF signal processing to communicate with UEs including the UE 2. The RF transceiver 1601 may include a plurality of transceivers. The RF transceiver 1601 is connected to an antenna array 1602 and the processor 1604. The RF transceiver 1601 receives modulated symbol data from the processor 1604, generates a transmission RF signal, and supplies the generated transmission RF signal to the antenna 1602. Further, the RF transceiver 1601 generates a baseband reception signal based on a reception RF signal received by the antenna 1602 and supplies this signal to the processor 1604. The RF transceiver 1601 may include an analog beam former circuit for beam forming. The analog beam former circuit includes, for example, a plurality of phase shifters and a plurality of power amplifiers.

The network interface 1603 is used to communicate with a network node (e.g., other gNBs, AMF, Session Management Function (SMF), and User Plane Function (UPF)). The network interface 1603 may include a network interface card (NIC) conforming to IEEE 802.3 series.

The processor 1604 performs digital baseband signal processing (i.e., data-plane processing) and control-plane processing for radio communication. The processor 1604 may include a plurality of processors. The processor 1604 may include a modem processor (e.g., Digital Signal Processor (DSP)) that performs the digital baseband signal processing and a protocol stack processor (e.g., Central Processing Unit (CPU) or Micro Processing Unit (MPU)) that performs the control-plane processing.

For example, the digital baseband signal processing by the processor 1604 may include signal processing in a Service Data Adaptation Protocol (SDAP) layer, a Packet Data Convergence Protocol (PDCP) layer, a Radio Link Control (RLC) layer, a Medium Access Control (MAC) layer, and a Physical (PHY) layer. Further, the control-plane processing by the processor 1604 may include processing of Non-Access Stratum (NAS) messages, RRC messages, MAC CEs, and DCIs.

The processor 1604 may include a digital beam former module for beam forming. The digital beam former module may include a Multiple Input Multiple Output (MIMO) encoder and a MIMO pre-coder.

The memory 1605 is a volatile memory, a nonvolatile memory, or a combination thereof. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1605 may include a storage located separately from the processor 1604. In this case, the processor 1604 may access the memory 1605 through the network interface 1603 or an I/O interface (not shown).

The memory 1605 may store one or more software modules (computer programs) 1606 including a set of instructions and data for performing the processing by performed the gNB 1 described in the above embodiments. In some implementations, the processor 1604 may load the software module(s) 1606 from the memory 1605 and execute the loaded software modules, thereby performing the processing of the gNB 1 described in the above embodiments.

Note that when the gNB 1 is a gNB-CU, the gNB 1 may not include the RF transceiver 1601 (and the antenna array 1602).

Figure 17:
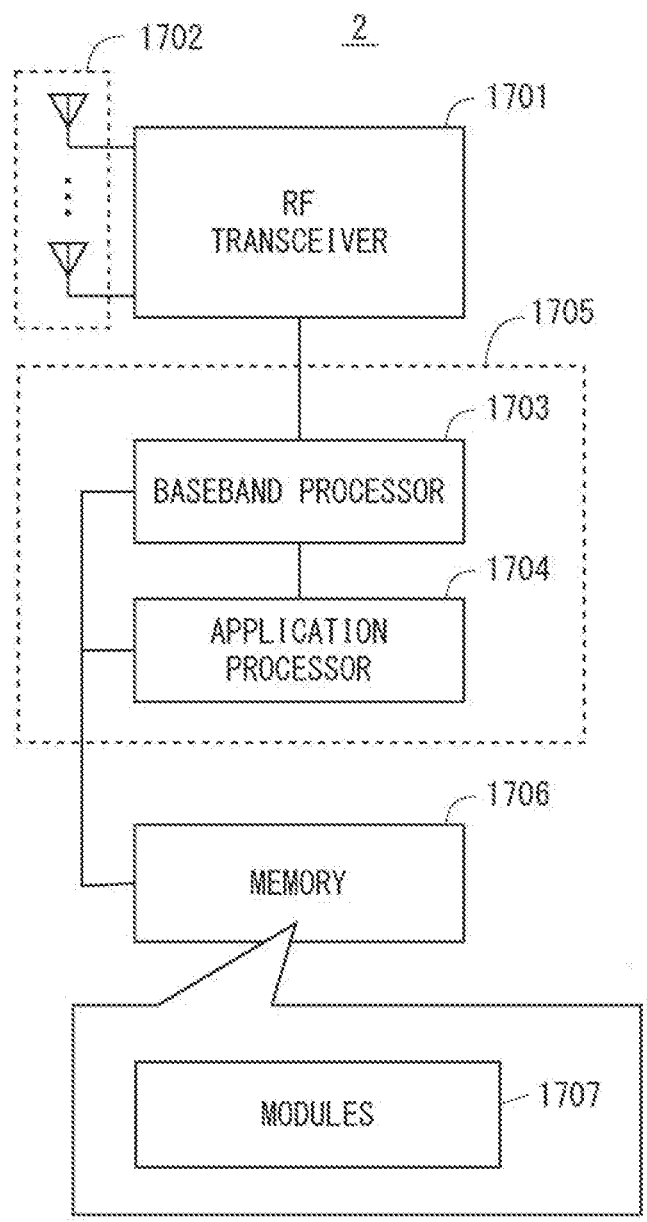
FIG. 17 is a block diagram showing an example of a configuration of a UE according to an embodiment.

FIG. 17 is a block diagram showing an example of a configuration of the UE 2. The Radio Frequency (RF) transceiver 1701 performs analog RF signal processing to communicate with NG-RAN nodes. The RF transceiver 1701 may include a plurality of transceivers. The analog RF signal processing performed by the RF transceiver 1701 includes frequency up-conversion, frequency down-conversion, and amplification. The RF transceiver 1701 is connected to an antenna array 1702 and the baseband processor 1703. The RF transceiver 1701 receives modulated symbol data (OFDM symbol data) from the baseband processor 1703, generates a transmission RF signal, and supplies the generated transmission RF signal to the antenna 1702. Further, the RF transceiver 1701 generates a baseband reception signal based on a reception RF signal received by the antenna 1702 and supplies this signal to the baseband processor 1703. The RF transceiver 1701 may include an analog beam former circuit for beam forming. The analog beam former circuit includes, for example, a plurality of phase shifters and a plurality of power amplifiers.

The baseband processor 1703 performs a digital baseband signal processing for radio communication (a data-plane process) and a control-plane process. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1703 may include, for example, signal processing of a Service Data Adaptation Protocol (SDAP) layer, Packet Data Convergence Protocol (PDCP) layer, Radio Link Control (RLC) layer, Medium Access Control (MAC) layer, and Physical (PHY) layer. Further, the control-plane processing performed by the baseband processor 1703 may include processing of Non-Access Stratum (NAS) protocols, Radio Resource Control (RRC) protocols, and MAC Control Elements (CEs).

The baseband processor 1703 may perform Multiple Input Multiple Output (MIMO) encoding and precoding for beam forming.

The baseband processor 1703 may include a modem-processor (e.g., a Digital Signal Processor (DSP)) that performs the digital baseband signal processing and a protocol-stack-processor (e.g., a Central Processing Unit (CPU), or a Micro Processing Unit (MPU)) that performs the control-plane processing. In this case, the protocol stack processor, which performs the control-plane processing, may be integrated with an application processor 1704 described in the following.

The application processor 1704 is also referred to as a CPU, an MPU, a microprocessor, or a processor core. The application processor 1704 may include a plurality of processors (or a plurality of processor cores). The application processor 1704 loads a system software program (Operating System (OS)) and various application programs (e.g., a call application, a WEB browser, a mailer, a camera operation application, and a music player application) from a memory 1706 or from another memory (not illustrated) and executes these programs, thereby providing various functions of the UE 2.

In some implementations, as represented by a dashed line (1705) in FIG. 14, the baseband processor 1703 and the application processor 1704 may be integrated on a single chip. In other words, the baseband processor 1703 and the application processor 1704 may be implemented in a single System on Chip (SoC) device 1705. An SoC device may be referred to as a Large-Scale Integration (LSI) or a chipset.

The memory 1706 is a volatile memory, a nonvolatile memory, or a combination thereof. The memory 1706 may include a plurality of memory devices that are physically independent from each other. The volatile memory is, for example, a Static Random Access Memory (SRAM), a Dynamic RAM (DRAM), or a combination thereof. The memory 1706 may include, for example, an external memory device that can be accessed from the baseband processor 1703, the application processor 1704, and the SoC 1705. The memory 1706 may include an internal memory device that is integrated in the baseband processor 1703, the application processor 1704, or the SoC 1705. Further, the memory 1706 may include a memory in a Universal Integrated Circuit Card (UICC).

The memory 1706 may store one or more software modules (computer programs) 1707 including a set of instructions and data for performing the processing by the UE 2 described in the above-described plurality of embodiments. In some implementations, the baseband processor 1703 or the application processor 1704 may load these software modules 1707 from the memory 1706 and execute the loaded software modules, thereby performing the processing of the UE 3 described in the above embodiments with reference to the drawings.

The control-plane processing and operations performed by the UE 2 described in the above embodiments can be achieved by the elements other than the RF transceiver 1701 and the antenna array 1702, i.e., achieved by the memory 1706, which stores the software modules 1707, and one or both of the baseband processor 1703 and the application processor.

As described above with reference to FIGS. 16 and 17, each of the processors included in the gNB 1 and the UE 2 in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Embodiments

The above-described embodiments may be implemented independently of each other, or may be implemented by combining the whole or a part of two or more embodiment as appropriate.

In the above embodiments, if the UE 2 is the second type of UE, the UE 2 may choose whether to use the first initial BWP or the second initial BWP. For example, if the UE 2 supports the first initial BWP (e.g., the bandwidth of the first initial BWP) (i.e., has the capability to communicate on the first initial BWP), then the UE 2 may select the first initial BWP and apply the first initial BWP configuration. On the other hand, if the UE 2 does not support the first initial BWP (e.g., the bandwidth of the first initial BWP) (i.e., does not have the capability to communicate on the first initial BWP), then the UE 2 may select the second initial BWP and apply the second initial BWP configuration. The UE 2 may perform this operation in a frequency band dependent manner. This operation may be specified in the 3GPP specifications.

The second initial BWP configuration in the above embodiments may be applied when the UE 2 performs a handover (also referred to as Reconfiguration with Sync). In the handover, an RRC Reconfiguration message is transmitted from a target gNB managing a target cell to the UE 2 via a source gNB managing a source cell. This RRC Reconfiguration message contains the cell common configuration information (e.g., ServingCellConfigCommon information element) to be used by the UE 2 in the target cell. This cell-common configuration information includes a downlinkConfigCommon information element which contains frequency information and cell-common initial DL BWP configuration information (e.g., initial downlink BWP common configuration). The existing downlinkConfigCommon information element indicates parameters that match those configured in the MIB and SIB1. For example, the same configurations of the initial DL BWP as those configured in the SIB1 of the target cell are sent to the UE via the RRC Reconfiguration message. This allows, for example, a UE that moves into (enters) the target cell via a handover and a UE that transitions from the RRC_IDLE state to the RRC_CONNECTED state via an RRC (connection) setup procedure to perform communication using the same radio resource configuration. In contrast, as in the above embodiments, the target gNB may include the second initial DL BWP configuration in the downlinkConfigCommon information element for the second type of UEs. The target gNB may recognize that the UE to be handed over is the second type of UE by the fact that a HANDOVER REQUEST message transmitted by the source gNB includes information explicitly or implicitly indicating that the UE is of the second type, or by UE Capability information contained in this message.

In addition to or instead of the second initial BWP configuration in the above embodiments, the RAN node (e.g., the gNB 1) may configure, to the second type of UE, a second channel bandwidth different from a first channel bandwidth set for the first type of UE. The second channel bandwidth may be narrower than or equal to the first channel bandwidth. The notification of the second channel bandwidth may be based on reference information different from that used for the notification of the first channel bandwidth. The reference information may indicate mapping among frequency band, subcarrier spacing (SCS), the channel bandwidth. More specifically, the channel bandwidth may be represented by a list of DL (or UL) channel bandwidths for respective subcarrier spacings (SCS) (e.g., downlinkChannelBW-PerSCS-List (or uplinkChannelBW-PerSCS-List)). This list may be a list of DL (or UL) channel bandwidth information (SCS-SpecificCarrier) for respective subcarrier spacings (SCS). The channel bandwidth information may include subcarrier spacing (SCS), carrier bandwidth, and carrier offset (offsetToCarrier). The carrier bandwidth may be information in a predetermined physical resource unit (e.g., Physical Resource Block (PRB)). The carrier offset may be an offset value from a predetermined frequency reference point (e.g., Point A). The second channel bandwidth may be configured (i.e., transmitted) to the second type of UE, for example, via an RRC Setup message in an RRC (connection) setup procedure, or via an RRC Reconfiguration message subsequent to this procedure. More specifically, the second channel bandwidth may be contained in a ServingCellConfig information element (IE) as new information (e.g., field, parameter).

The following configurations may be employed to enable the gNB 1 to be aware of an applicable or intended use cases of the UE 2 (e.g., Reduced capability NR device). In some implementations, the gNB 1 may broadcast information indicating use cases supported in the cell via system information (e.g., SIB1 or other SI). In this case, if the applicable or intended use case of the UE 2 is supported by a cell, then the UE 2 can access the cell. In other implementations, the UE 2 may inform the gNB 1 of the applicable or intended use case via an initial RRC message (Msg3), e.g., via an RRC Setup Request message, after the initiation of random access. Alternatively, the UE 2 may inform the gNB 1 of the applicable or intended use case via an RRC Setup Complete message (Msg5). In other implementations, the core network (e.g., AMF of 5GC) may inform the gNB 1 of the applicable or intended use case of the UE 2.

The above-described embodiments are merely examples of applications of the technical ideas obtained by the inventors of the present application. That is, these technical ideas are not limited to the above embodiments and various modifications may be made thereto.

For example, the whole or part of the embodiments disclosed above can be described as, but not limited to, the following supplementary notes.

(Supplementary Note 1)

A Radio Access Network (RAN) node comprising:
at least one memory; and
at least one processor coupled to the at least one memory and configured to:
  broadcast a first initial bandwidth part (BWP) configuration via system information; and
  broadcast a second initial BWP configuration via the system information or transmit the second initial BWP configuration via radio terminal dedicated signaling,
wherein the first initial BWP configuration includes cell-specific common parameters of a first initial BWP of a cell,
wherein the second initial BWP configuration includes cell-specific common parameters of a second initial BWP of the cell,
wherein the first initial BWP is used by at least a first type of radio terminal that performs contention-based random access in the cell,
wherein the second initial BWP is not used by the first type of radio terminal, but is used by a second type of radio terminal that has a limited capability compared to the first type of radio terminal and that performs contention-based random access in the cell, and
wherein a bandwidth of the second initial BWP is equal to or narrower than a bandwidth of the first initial BWP.

(Supplementary Note 2)

The RAN node according to Supplementary Note 1, wherein
  the cell-specific common parameters of the first initial BWP include parameters indicating a frequency-domain position and bandwidth of the first initial BWP, and
  the cell-specific common parameters of the second initial BWP include parameters indicating a frequency-domain position and bandwidth of the second initial BWP.

(Supplementary Note 3)

The RAN node according to Supplementary Note 1 or 2, wherein
  the cell-specific common parameters of the first initial BWP include Physical Downlink Control Channel (PDCCH) parameters for configuring a common search space in the first initial BWP used to transmit a Downlink Control Information (DCI) format indicating resources on which a system information message is broadcast, and
  the cell-specific common parameters of the second initial BWP include PDCCH parameters for configuring a common search space in the second initial BWP used to transmit a DCI format indicating resources on which the system information message is broadcast.

(Supplementary Note 4)

The RAN node according to any one of Supplementary Notes 1 to 3, wherein
  the cell-specific common parameters of the first initial BWP include random access parameters that at least the first type of radio terminal uses for contention-based random access in the first initial BWP, and the cell-specific common parameters of the second initial BWP include random access parameters that the second type of radio terminal uses for contention-based random access in the second initial BWP.

(Supplementary Note 5)

The RAN node according to any one of Supplementary Notes 1 to 4, wherein
the first initial BWP is used for initial access to the cell by at least the first type of radio terminal, and
the second initial BWP is used for initial access to the cell by the second type of radio terminal.

(Supplementary Note 6)

The RAN node according to any one of Supplementary Notes 1 to 5, wherein
the first initial BWP is a cell-specific BWP commonly used by at least the first type of radio terminal, and
the second initial BWP is a cell-specific BWP commonly used by the second type of radio terminal.

(Supplementary Note 7)

The RAN node according to any one of Supplementary Notes 1 to 6, wherein
the first initial BWP configuration is used when the first type of radio terminal is in a Radio Resource Control (RRC)_IDLE state or RRC_INACTIVE state, and
the second initial BWP configuration is used when the second type of radio terminal is in an RRC_IDLE state or RRC_INACTIVE state.

(Supplementary Note 8)

The RAN node according to any one of Supplementary Notes 1 to 7, wherein
the first initial BWP includes a first initial downlink (DL) BWP and a first initial uplink (UL) BWP, and
the second initial BWP includes a second initial downlink (DL) BWP and a second initial uplink (UL) BWP.

(Supplementary Note 9)

The RAN node according to any one of Supplementary Notes 1 to 8, wherein the at least one processor is configured to broadcast the second initial BWP configuration, together with the first initial BWP configuration, via the system information.

(Supplementary Note 10)

The RAN node according to any one of Supplementary Notes 1 to 8, wherein the at least one processor is configured to transmit the second initial BWP configuration to the second type of radio terminal via a Radio Resource Control (RRC) Setup message during a contention-based random access procedure.

(Supplementary Note 11)

The RAN node according to Supplementary Note 10, wherein
the RAN node comprises a Central Unit (CU) configured to provide at least a Radio Resource Control (RRC) function, and a Distributed Unit (DU) configured to provide at least a Medium Access Control (MAC) function,
the DU is configured to send a first control message including an indication of limited capability to the CU in response to detecting access from the second type of radio terminal, and
the CU is configured to, in response to receiving the indication, generate the RRC Setup message containing the second initial BWP configuration and send a second control message containing the RRC Setup message to the DU.

(Supplementary Note 12)

The RAN node according to Supplementary Note 11, wherein
the DU is configured to include the second initial BWP configuration in the first control message, and
the CU is configured to include the second initial BWP configuration retrieved from the first control message in the RRC Setup message.

(Supplementary Note 13)

The RAN node according to any one of Supplementary Notes 1 to 8, wherein the at least one processor is configured to transmit the second initial BWP configuration via an RRC Reconfiguration message after completion of RRC setup of the second type of radio terminal.

(Supplementary Note 14)

The RAN node according to Supplementary Note 13, wherein the at least one processor is configured to receive capability information of a radio terminal from a core network, and include the second initial BWP configuration in the RRC Reconfiguration message when the capability information indicates a limited capability.

(Supplementary Note 15)

The RAN node according to any one of Supplementary Notes 10 to 14, wherein
the at least one processor is configured to broadcast radio access network (RAN) area information via the system information, and
the RAN area information is used by the second type of radio terminal to determine whether to continue using the second initial BWP configuration when the second type of radio terminal is in an RRC_IDLE state or RRC_INACTIVE state after receiving the second initial BWP configuration.

(Supplementary Note 16)

The RAN node according to any one of Supplementary Notes 1 to 15, wherein the second type of radio terminal supports a bandwidth narrower than a bandwidth supported by the first type of radio terminal.

(Supplementary Note 17)

A radio terminal comprising:
at least one memory; and
at least one processor coupled to the at least one memory and configured to
receive system information containing a first initial bandwidth part (BWP) configuration;
receive a second initial BWP configuration via the system information or via radio terminal dedicated signaling; and
use the second initial BWP configuration,
wherein the first initial BWP configuration includes cell-specific common parameters of a first initial BWP of a serving cell of the radio terminal,
wherein the second initial BWP configuration includes cell-specific common parameters of a second initial BWP of the serving cell,
wherein the first initial BWP is used by at least a first type of radio terminal that performs contention-based random access in the serving cell,
wherein the second initial BWP is not used by the first type of radio terminal, but is used by a second type of radio terminal that has a limited capability compared to the first type of radio terminal and performs contention-based random access in the serving cell, and
wherein a bandwidth of the second initial BWP is equal to or narrower than a bandwidth of the first initial BWP.

(Supplementary Note 18)
The radio terminal according to Supplementary Note 17, wherein
the cell-specific common parameters of the first initial BWP include parameters indicating a frequency-domain position and bandwidth of the first initial BWP, and
the cell-specific common parameters of the second initial BWP include parameters indicating a frequency-domain position and bandwidth of the second initial BWP.

(Supplementary Note 19)
The radio terminal according to Supplementary Note 17 or 18, wherein
the cell-specific common parameters of the first initial BWP include Physical Downlink Control Channel (PDCCH) parameters for configuring a common search space in the first initial BWP used to transmit a Downlink Control Information (DCI) format indicating resources on which a system information message is broadcast, and
the cell-specific common parameters of the second initial BWP include PDCCH parameters for configuring a common search space in the second initial BWP used to transmit a DCI format indicating resources on which the system information message is broadcast.

(Supplementary Note 20)
The radio terminal according to any one of Supplementary Notes 17 to 19, wherein
the cell-specific common parameters of the first initial BWP include random access parameters that at least the first type of radio terminal uses for contention-based random access in the first initial BWP, and
the cell-specific common parameters of the second initial BWP include random access parameters that the second type of radio terminal uses for contention-based random access in the second initial BWP.

(Supplementary Note 21)
The radio terminal according to any one of Supplementary Notes 17 to 20, wherein
the first initial BWP is used for initial access to the serving cell by at least the first type of radio terminal, and
the second initial BWP is used for initial access to the serving cell by the second type of radio terminal.

(Supplementary Note 22)
The radio terminal according to any one of Supplementary Notes 17 to 21, wherein
the first initial BWP is a cell-specific BWP commonly used by at least the first type of radio terminal, and
the second initial BWP is a cell-specific BWP commonly used by the second type of radio terminal.

(Supplementary Note 23)
The radio terminal according to any one of Supplementary Notes 17 to 22, wherein
the first initial BWP configuration is used when the first type of radio terminal is in a Radio Resource Control (RRC) IDLE state or RRC_INACTIVE state, and
the second initial BWP configuration is used when the second type of radio terminal is in an RRC_IDLE state or RRC_INACTIVE state.

(Supplementary Note 24)
The radio terminal according to any one of Supplementary Notes 17 to 23, wherein
the first initial BWP includes a first initial downlink (DL) BWP and a first initial uplink (UL) BWP, and
the second initial BWP includes a second initial downlink (DL) BWP and a second initial uplink (UL) BWP.

(Supplementary Note 25)
The radio terminal according to any one of Supplementary Notes 17 to 24, wherein the at least one processor is configured to receive the second initial BWP configuration, together with the first initial BWP configuration, via the system information.

(Supplementary Note 26)
The radio terminal according to any one of Supplementary Notes 17 to 24, wherein the at least one processor is configured to receive the second initial BWP configuration via a Radio Resource Control (RRC) Setup message during a contention-based random access procedure.

(Supplementary Note 27)
The radio terminal according to any one of Supplementary Notes 17 to 24, wherein the at least one processor is configured to receive the second initial BWP configuration via an RRC Reconfiguration message after completion of RRC setup.

(Supplementary Note 28)
The radio terminal according to Supplementary Note 26 or 27, wherein the at least one processor is configured to:
receive radio access network (RAN) area information via the system information; and
use the RAN area information to determine whether to continue using the second initial BWP configuration when the radio terminal is in an RRC_IDLE state or RRC_INACTIVE state after receiving the second initial BWP configuration.

(Supplementary Note 29)
The radio terminal according to any one of Supplementary Notes 17 to 28, wherein the at least one processor is configured to, in response to receiving an RRC Setup message from a network for establishment of a new RRC connection despite having initiated an RRC connection resumption procedure or an RRC connection reestablishment procedure, transmit an RRC Setup complete message including an indication of limited capability to the network.

(Supplementary Note 30)
The radio terminal according to any one of Supplementary Notes 17 to 29, wherein the second type of radio terminal supports a bandwidth narrower than a bandwidth supported by the first type of radio terminal.

(Supplementary Note 31)
A method performed by a Radio Access Network (RAN) node, the method comprising:
broadcasting a first initial bandwidth part (BWP) configuration via system information; and
broadcasting a second initial BWP configuration via the system information or transmitting the second initial BWP configuration via radio terminal dedicated signaling,
wherein the first initial BWP configuration includes cell-specific common parameters of a first initial BWP of a cell,
wherein the second initial BWP configuration includes cell-specific common parameters of a second initial BWP of the cell,
wherein the first initial BWP is used by at least a first type of radio terminal that performs contention-based random access in the cell,
wherein the second initial BWP is not used by the first type of radio terminal, but is used by a second type of radio terminal that has a limited capability compared to the first type of radio terminal and that performs contention-based random access in the cell, and
wherein a bandwidth of the second initial BWP is equal to or narrower than a bandwidth of the first initial BWP.

(Supplementary Note 32)

A method performed by a radio terminal, the method comprising:
- receiving system information containing a first initial bandwidth part (BWP) configuration;
- receiving a second initial BWP configuration via the system information or via radio terminal dedicated signaling; and
- using the received second initial BWP configuration,
- wherein the first initial BWP configuration includes cell-specific common parameters of a first initial BWP of a serving cell of the radio terminal,
- wherein the second initial BWP configuration includes cell-specific common parameters of a second initial BWP of the serving cell,
- wherein the first initial BWP is used by at least a first type of radio terminal that performs contention-based random access in the serving cell,
- wherein the second initial BWP is not used by the first type of radio terminal, but is used by a second type of radio terminal that has a limited capability compared to the first type of radio terminal and performs contention-based random access in the serving cell, and
- wherein a bandwidth of the second initial BWP is equal to or narrower than a bandwidth of the first initial BWP.

(Supplementary Note 33)

A non-transitory computer readable medium storing a program for causing a computer to perform a method for a Radio Access Network (RAN) node, the method comprising:
- broadcasting a first initial bandwidth part (BWP) configuration via system information; and
- broadcasting a second initial BWP configuration via the system information or transmitting the second initial BWP configuration via radio terminal dedicated signaling,
- wherein the first initial BWP configuration includes cell-specific common parameters of a first initial BWP of a cell,
- wherein the second initial BWP configuration includes cell-specific common parameters of a second initial BWP of the cell,
- wherein the first initial BWP is used by at least a first type of radio terminal that performs contention-based random access in the cell,
- wherein the second initial BWP is not used by the first type of radio terminal, but is used by a second type of radio terminal that has a limited capability compared to the first type of radio terminal and that performs contention-based random access in the cell, and
- wherein a bandwidth of the second initial BWP is equal to or narrower than a bandwidth of the first initial BWP.

(Supplementary Note 34)

A non-transitory computer readable medium storing a program for causing a computer to perform a method for a radio terminal, the method comprising:
- receiving system information containing a first initial bandwidth part (BWP) configuration;
- receiving a second initial BWP configuration via the system information or via radio terminal dedicated signaling; and
- using the received second initial BWP configuration,
- wherein the first initial BWP configuration includes cell-specific common parameters of a first initial BWP of a serving cell of the radio terminal,
- wherein the second initial BWP configuration includes cell-specific common parameters of a second initial BWP of the serving cell,
- wherein the first initial BWP is used by at least a first type of radio terminal that performs contention-based random access in the serving cell,
- wherein the second initial BWP is not used by the first type of radio terminal, but is used by a second type of radio terminal that has a limited capability compared to the first type of radio terminal and performs contention-based random access in the serving cell, and
- wherein a bandwidth of the second initial BWP is equal to or narrower than a bandwidth of the first initial BWP.

This application is based upon and claims the benefit of priority from Japanese patent application No. 2020-022376, filed on Feb. 13, 2020, the disclosure of which is incorporated herein in its entirety by reference.

REFERENCE SIGNS LIST

1 GNB
2 UE
11 CENTRAL UNIT (CU)
12 DISTRIBUTED UNIT (DU)
1504 PROCESSOR
1505 MEMORY
1506 MODULES
1603 BASEBAND PROCESSOR
1604 APPLICATION PROCESSOR
1606 MEMORY
1607 MODULES

What is claimed is:

1. A method of a User Equipment (UE), the method comprising:
- receiving a System Information Block Type 1 (SIB1) containing an initial bandwidth part (BWP) configuration for first UEs and an initial BWP configuration for reduced capability terminals; and
- performing a random access procedure based on the initial BWP configuration for reduced capability terminals,
- wherein the performing the random access procedure comprises transmitting a specific Logical channel ID (LCID) associated with a reduced capability terminal to a base station in a message in the random access procedure.

2. The method according to claim 1, wherein the initial BWP configuration for reduced capability terminals is contained in a ServingCellConfigCommonSIB information element contained in the SIB1.

3. The method according to claim 1, wherein the initial BWP configuration for reduced capability terminals includes an initial downlink (DL) BWP and an initial uplink (UL) BWP.

4. The method according to claim 1, wherein the initial BWP configuration for reduced capability terminals includes parameters indicating a frequency domain location and bandwidth of an initial uplink (UL) BWP for reduced capability terminals.

5. The method according to claim 4, wherein the parameters indicating the frequency domain location and bandwidth are contained in a locationAndBandwidth field within a genericParameters field of an initial BWP field for reduced capability terminals.

6. The method according to claim 1, wherein the performing the random access procedure comprises transmitting a random access preamble based on the initial BWP configuration for reduced capability terminals.

7. A User Equipment (UE) comprising:
a memory; and
at least one processor coupled to the memory and configured to:
receive a System Information Block Type 1 (SIB1) containing an initial bandwidth part (BWP) configuration for first UEs and an initial BWP configuration for reduced capability terminals; and
perform a random access procedure based on the initial BWP configuration for reduced capability terminals,
wherein the at least one processor is further configured to transmit a specific Logical channel ID (LCID) associated with a reduced capability terminal to a base station in a first message in the random access procedure.

8. The UE according to claim 7, wherein the initial BWP configuration for reduced capability terminals is contained in a ServingCellConfigCommonSIB information element contained in the SIB1.

9. The UE according to claim 7, wherein the initial BWP configuration for reduced capability terminals includes an initial downlink (DL) BWP and an initial uplink (UL) BWP.

10. The UE according to claim 7, wherein the initial BWP configuration for reduced capability terminals includes parameters indicating a frequency domain location and bandwidth of an initial uplink (UL) BWP for reduced capability terminals.

11. The UE according to claim 10, wherein the parameters indicating the frequency domain location and bandwidth are contained in a locationAndBandwidth field within a genericParameters field of an initial BWP field for reduced capability terminals.

12. The UE according to claim 7, wherein the performing the random access procedure comprises transmitting a random access preamble based on the initial BWP configuration for reduced capability terminals.

13. A method of a base station, the method comprising:
transmitting a System Information Block Type 1 (SIB1) containing an initial bandwidth part (BWP) configuration for first User Equipments (UEs) and an initial BWP configuration for reduced capability terminals;
receiving a first message regarding a random access procedure based on the SIB1; and
receiving a specific Logical channel ID (LCID) associated with a reduced capability terminal in a second message in the random access procedure.

14. The method according to claim 13, wherein the first message regarding the random access procedure is based on the initial BWP configuration for reduced capability terminals contained in the SIB1.

15. The method according to claim 13, wherein
the base station is a Distributed Unit (DU), and
the method further comprises:
receiving from a UE a specific Logical channel ID (LCID) associated with a reduced capability terminal; and
sending to a Central Unit (CU) connected via an F1 interface an INITIAL UL RRC MESSAGE TRANSFER message containing an indication that the UE is a reduced capability terminal.

16. The method according to claim 13, wherein
the base station is a Distributed Unit (DU), and
the method further comprises sending to a Central Unit (CU) a SETUP REQUEST message containing the initial BWP configuration for reduced capability terminals.

17. The method according to claim 13, wherein
the base station is a Distributed Unit (DU), and
the method further comprises sending to a Central Unit (CU) a gNB-DU CONFIGURATION UPDATE message containing the initial BWP configuration for reduced capability terminals.

18. The method according to claim 13, wherein the initial BWP configuration for reduced capability terminals is contained in a ServingCellConfigCommonSIB information element contained in the SIB1.

19. The method according to claim 13, wherein the initial BWP configuration for reduced capability terminals includes an initial downlink (DL) BWP and an initial uplink (UL) BWP.

20. The method according to claim 13, wherein the initial BWP configuration for reduced capability terminals includes parameters indicating a frequency domain location and bandwidth of an initial uplink (UL) BWP for reduced capability terminals.

21. The method according to claim 20, wherein the parameters indicating the frequency domain location and bandwidth are contained in a locationAndBandwidth field within a genericParameters field of an initial BWP field for reduced capability terminals.

* * * * *